United States Patent
Shintani

(10) Patent No.: US 8,807,852 B1
(45) Date of Patent: Aug. 19, 2014

(54) SHUTTER CHARGING DEVICE AND IMAGING DEVICE

(71) Applicant: Panasonic Corporation, Osaka (JP)

(72) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/253,869

(22) Filed: Apr. 16, 2014

Related U.S. Application Data

(63) Continuation of application No. PCT/JP2012/006724, filed on Oct. 19, 2012.

(30) Foreign Application Priority Data

Oct. 21, 2011 (JP) .................................. 2011-231398

(51) Int. Cl.
G03B 9/08 (2006.01)
G03B 9/32 (2006.01)

(52) U.S. Cl.
CPC ........................................ *G03B 9/32* (2013.01)
USPC .......................................................... 396/453

(58) Field of Classification Search
CPC ........................................................ G03B 9/32
USPC .......................................................... 396/453
See application file for complete search history.

(56) References Cited

U.S. PATENT DOCUMENTS

| | | | | |
|---|---|---|---|---|
| 3,593,630 A | * | 7/1971 | Douglas | 396/242 |
| 4,081,810 A | * | 3/1978 | Onda et al. | 396/489 |
| 4,290,682 A | * | 9/1981 | Saito et al. | 396/469 |
| 4,657,366 A | * | 4/1987 | Tanabe et al. | 396/456 |
| 4,692,009 A | * | 9/1987 | Toyoda et al. | 396/456 |
| 6,088,534 A | * | 7/2000 | Tominaga et al. | 396/64 |
| 6,749,348 B2 | | 6/2004 | Seita | |
| 8,147,152 B2 | * | 4/2012 | Nakagawa | 396/502 |
| 8,393,805 B2 | * | 3/2013 | Kosaka | 396/358 |
| 8,482,661 B2 | | 7/2013 | Misawa | |
| 2004/0018015 A1 | | 1/2004 | Seita | |
| 2010/0321556 A1 | | 12/2010 | Misawa | |
| 2011/0255857 A1 | * | 10/2011 | Okutani | 396/466 |
| 2013/0209081 A1 | * | 8/2013 | Shida | 396/260 |

FOREIGN PATENT DOCUMENTS

| | | |
|---|---|---|
| JP | 2004-061865 | 2/2004 |
| JP | 2011-001988 | 1/2011 |

OTHER PUBLICATIONS

International Search Report of PCT Application PCT/JP2012/006724 dated Dec. 18, 2012.

* cited by examiner

*Primary Examiner* — Rodney Fuller
(74) *Attorney, Agent, or Firm* — Panasonic Patent Center

(57) ABSTRACT

A shutter charging device for a focal plane shutter with which a stable charging time can be obtained and frame speed can be improved during continuous capture. A shutter charging device charges a focal plane shutter device comprising an opening and a first curtain blade and second curtain blade that can block off the opening. The shutter charging device comprises a charging member that drives the first curtain blade and the second curtain blade in a predetermined sequence, a gear component that includes a drive gear for driving the charging member one sequence by each rotation and transmits the rotation of a DC motor to the charging member, and a lock lever that stops the drive gear. The lock lever operates so as to stop the drive gear at a predetermined timing within one sequence.

9 Claims, 20 Drawing Sheets

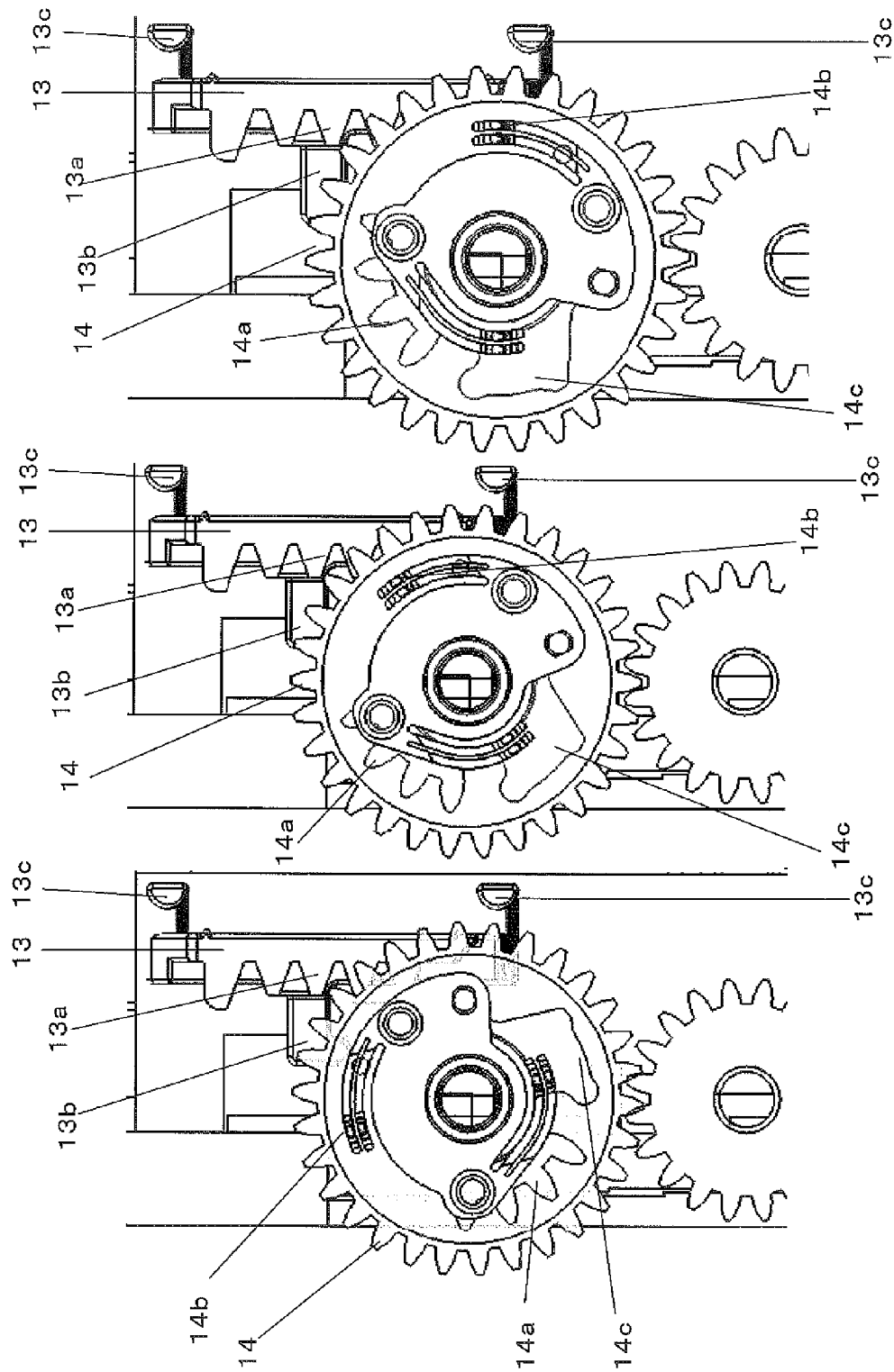

SHUTTER CHARGING DEVICE AND IMAGING DEVICE

CROSS-REFERENCE TO RELATED APPLICATIONS

This application is a continuation application of International Application No. PCT/JP2012/006724, filed Oct. 19, 2012, designating the United States and claiming priority to Japanese Patent Application No. 2011-231398 filed on Oct. 21, 2011, the entire contents of both applications being incorporated by reference herein.

BACKGROUND OF THE INVENTION

1. Field of the Invention

The present invention relates to a shutter charging device and an imaging device with which a focal plane shutter or another such shutter device is charged.

2. Description of the Related Art

In order to achieve a live-view function in a digital single-lens camera, Patent Literature 1 discloses a so-called normally-open function, in which the first curtain is held in a movement completed state after the charging of the first and second curtains of a focal plane shutter. The term "charging" here refers to an operation whereby a biasing force is imparted to (power is stored in) an elastic member (a spring) that generates a drive force for moving the first curtain or second curtain of a shutter device (release operation). With this shutter charging device, a normally-open function is achieved by separating a setting lever for charging the first curtain from a drive member linked to the first curtain and keeping the drive member in a movement completed state while the setting lever is in a charge completed state.

CITATION LIST

Patent Literature

Patent Literature 1: Japanese Laid-Open Patent Application 2004-61865

PROBLEM TO BE SOLVED BY THE INVENTION

With a conventional focal plane shutter equipped with a normally-open function, the shutter device opening has to be blocked off by the first curtain immediately prior to imaging for an imaging operation from a live-view state. This blocking requires charge drive by a DC motor or the like, but this drive is preferably limited to a very slight movement in order to reduce release time lag. Short braking or the like is actuated immediately after power is sent to the DC motor, but load variance in the drive train, or fluctuation in load due to temperature can end up causing variance in the stop position of the drive train. As a result, the starting position of the charging drive for the next imaging will end up changing, resulting in variance in charging time. To absorb this variance, a time margin must be provided, especially during continuous capture, making it difficult to raise the frame rate (the number of images captured per second during continuous capture).

SUMMARY OF THE INVENTION

The present disclosure provides an imaging device and a shutter charging device that solve this problem and with which a stable charging time can be obtained and the frame rate during continuous capture can be improved.

The stated object is achieved by a shutter charging device for charging a shutter device equipped with an opening and first and second curtains capable of blocking off the opening, said device comprising a driver for driving the first and second curtains in a predetermined sequence, a gear component that includes a drive gear for driving the driver just one sequence by each rotation and that transmits the rotation of the motor to the driver, and a brake member for stopping the drive gear, wherein the brake member operates so that the drive gear stops at a predetermined timing in one sequence.

With this disclosure, it is possible to provide an imaging device and a shutter charging device with which a stable charging time can be obtained and the frame rate during continuous capture can be improved.

BRIEF DESCRIPTION OF DRAWINGS

FIGS. 12A to 12C are diagrams of variance in the stop position of the drive gear 14 of the shutter charging device 1;

DETAILED DESCRIPTION OF THE INVENTION

Embodiments will now be described in detail through reference to the drawings as needed. However, unnecessarily detailed description may be omitted. For example, redundant description of substantially the same components and detailed description of matters already well known may be omitted. This is to keep the following description from being needlessly redundant, and to facilitate an understanding on the part of those skilled in the art.

The following description and the appended drawings are provided to enable anyone skilled in the art to fully understand the present disclosure, and the inventors do not intend for these to limit the subject matter discussed in the Claims Embodiment 1

The shutter charging device pertaining to Embodiment 1, and a digital camera in which this device is used, will be described through reference to the drawings.

1: Overview of Digital Camera

First, a digital camera 300 in which a focal plane shutter device 2 and a shutter charging device 1 are installed will be described in brief through reference to the drawings. The focal plane shutter device 2 and the shutter charging device 1 can also be installed in some other cameras besides the digital camera 300 of this embodiment.

Figure 1:
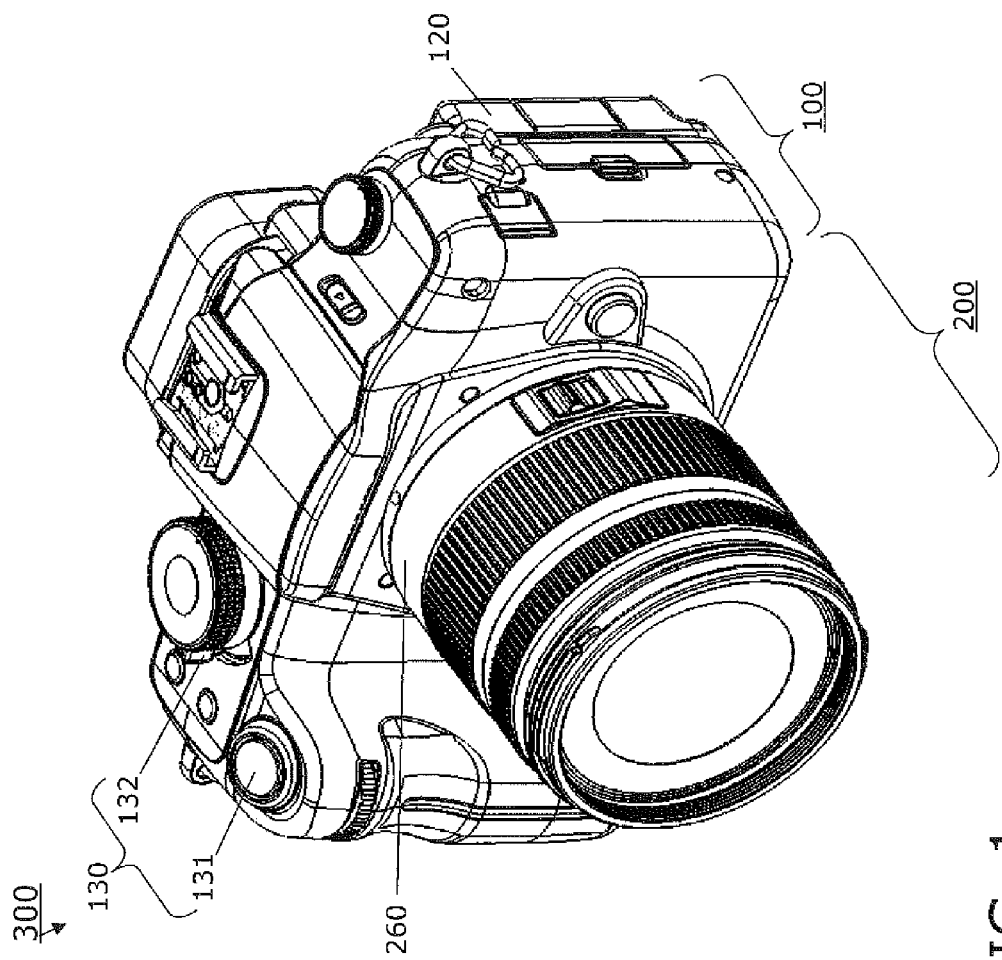
FIG. 1 is an oblique view of the digital camera in Embodiment 1.
Figure 2:
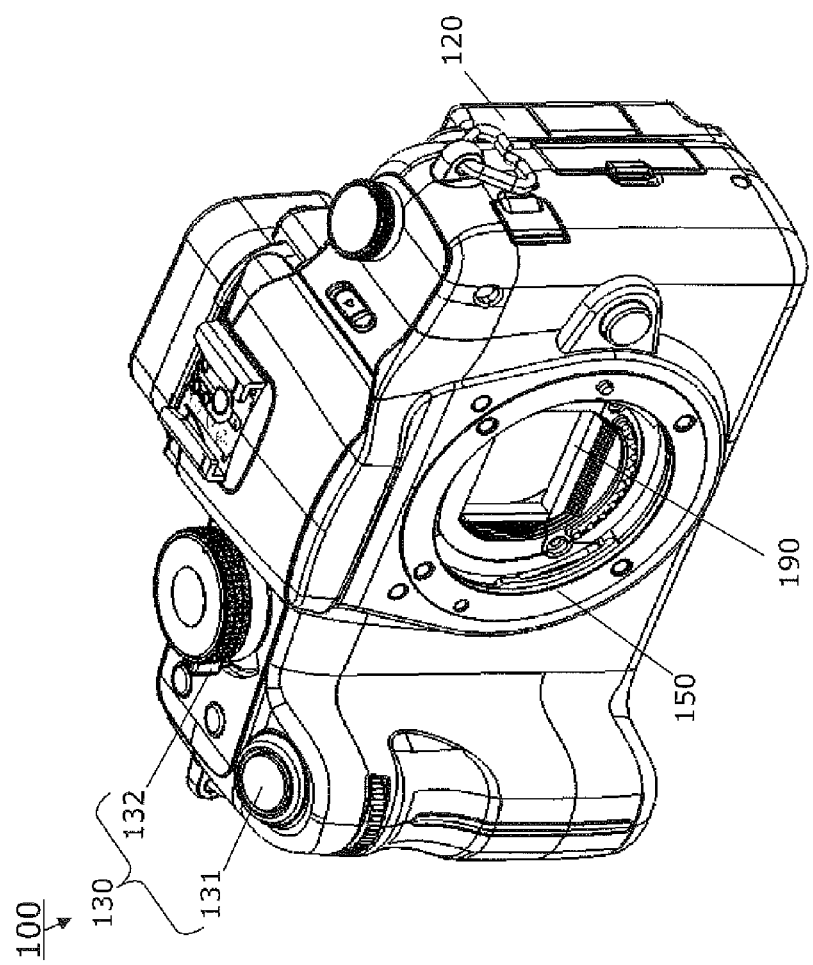
FIG. 2 is an oblique view of the camera body in Embodiment 1.
Figure 3:
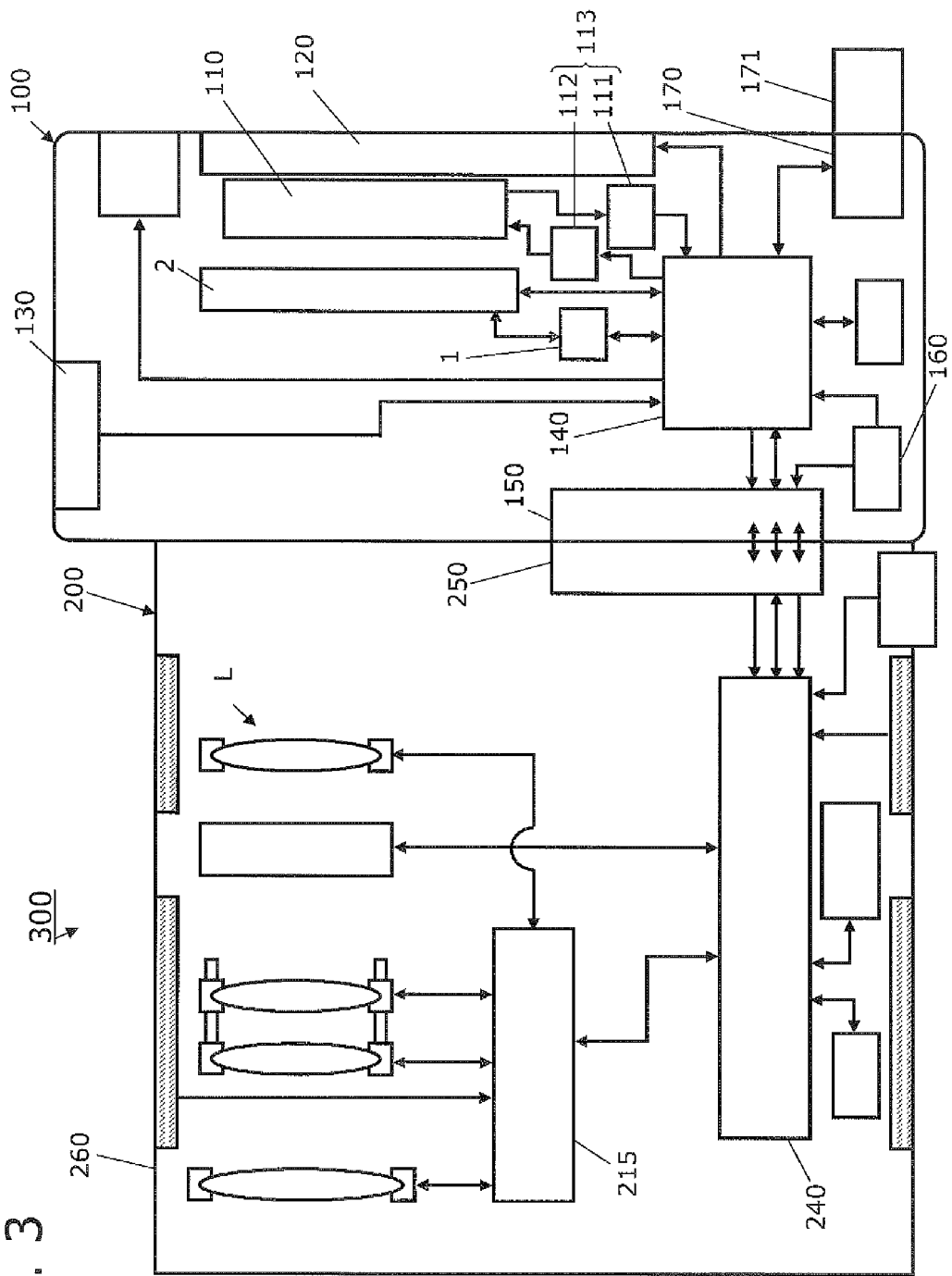
FIG. 3 is a block diagram of the digital camera in Embodiment 1.

FIG. 1 is an oblique view of the digital camera 300 pertaining to Embodiment 1. FIG. 2 is an oblique view of the camera body 100. FIG. 3 is a functional block diagram of the digital camera 300.

The digital camera 300 is an interchangeable lens type of digital camera, and comprises a camera body 100 and a wearable lens unit 200 to the camera body 100.

Figure 4:
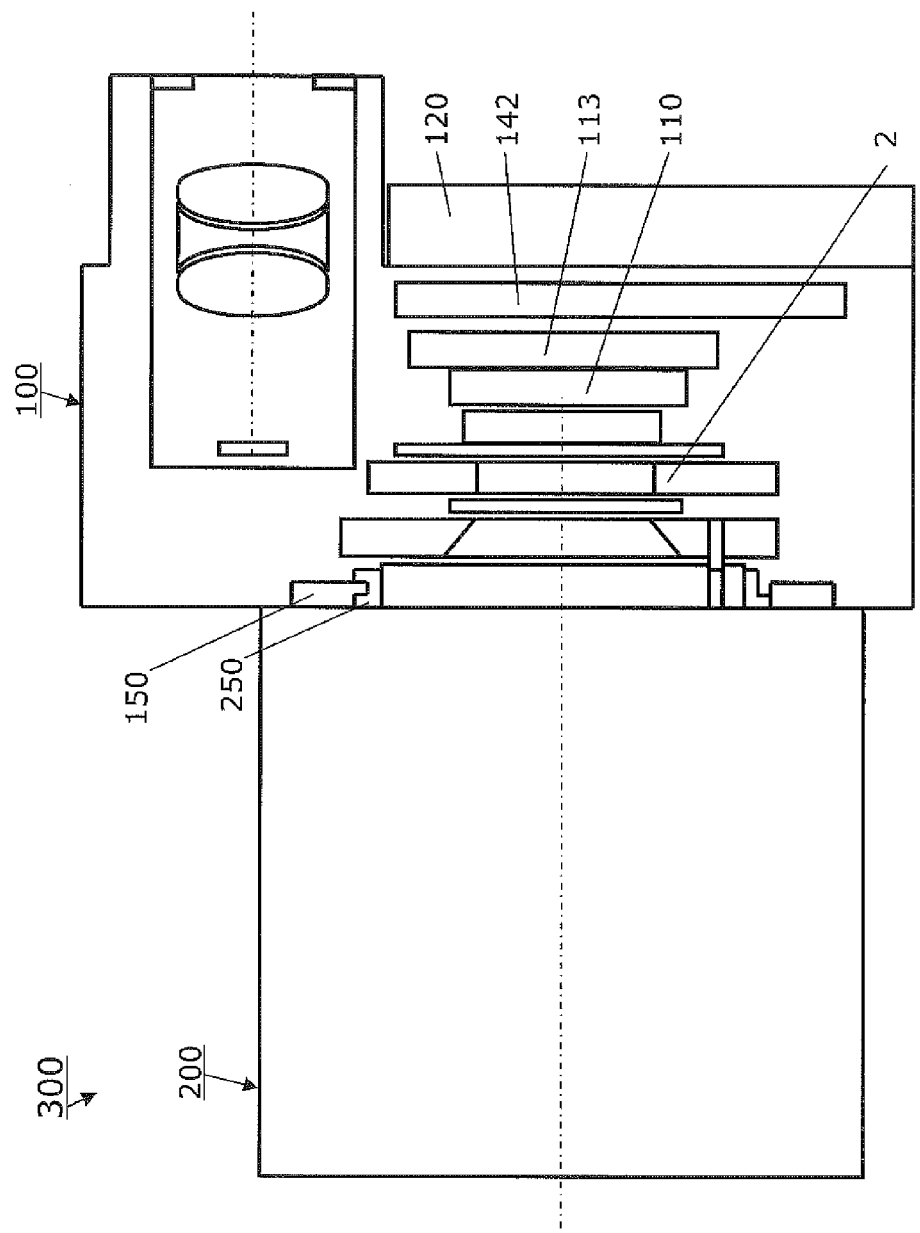
FIG. 4 is a simplified cross section of digital camera in Embodiment 1.
Figure 5:
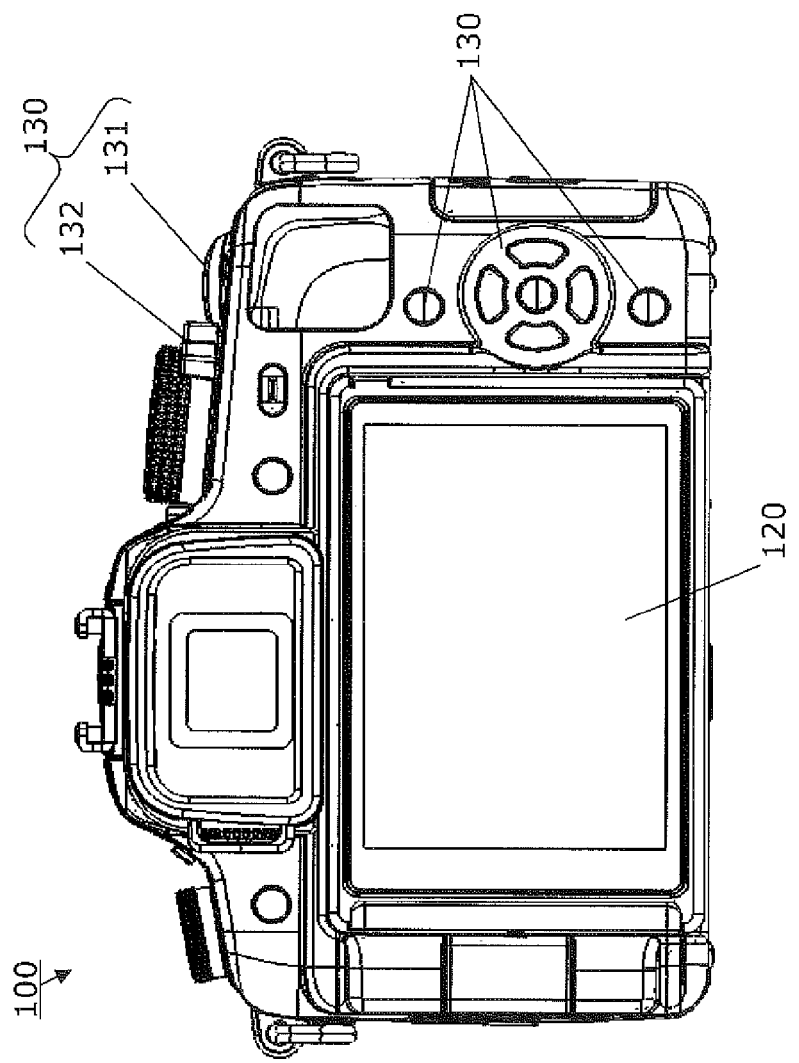
FIG. 5 is a rear view of the camera body in Embodiment 1.

FIG. 4 is a simplified cross section of the digital camera 300. FIG. 5 is a rear view of the camera body. The camera body 100 mainly comprises a CMOS (complementary metal oxide semiconductor) image sensor 110, a CMOS circuit board 113, a camera monitor 120, an interface unit 130, a main circuit board 142 including a camera controller 140, a body mount 150, a power supply 160, a card slot 170, the shutter charging device 1, and the focal plane shutter device 2.

The CMOS image sensor 110 (an example of an imaging device) converts an optical image of a subject that enters through a lens unit 200 (hereinafter also referred to a subject image), into image data. The image data thus produced is digitized by an A/D converter 111 of the CMOS circuit board 113. The image data digitized by the A/D converter 111 undergoes various image processing by the camera controller 140. The "various image processing" referred to here includes, for example, gamma correction processing, white balance correction processing, scratch correction processing, YC conversion processing, electronic zoom processing, and JPEG compression processing.

The CMOS image sensor 110 operates on the basis of a timing signal generated by a timing generator 112. The CMOS image sensor 110 can acquire moving picture data and still picture data under the control of the CMOS circuit board 113. Acquired moving picture data is also used to display a through image. Moving picture data and still picture data are an example of image data.

The term "through image" here refers to an image that is not recorded to a memory card 171, out of the moving picture data. A through image is primarily a moving picture, and is displayed on the camera monitor 120 to determine the composition of a still picture or moving picture.

The CMOS image sensor 110 is able to acquire a moving picture of low resolution to be used as a through image, and to acquire moving pictures of high resolution to be used for recording. The high-resolution moving pictures may be, for example, HD size: video (high definition size: 1920×1080 pixels). The CMOS image sensor 110 is also an example of an imaging element that converts an optical image of a subject into an electrical image signal. The concept of an imaging element here encompasses an opto-electric conversion element such as a CCD image sensor, in addition to the CMOS image sensor 110.

The CMOS circuit board 113 is a circuit board that controls the CMOS image sensor 110. The CMOS circuit board 113 is a circuit board for performing predetermined processing on the image data outputted from the CMOS image sensor 110, and includes the A/D converter 111 and the timing generator 112. The CMOS circuit board 113 is an example of an imaging element circuit board for controlling the drive of the imaging element and performing predetermined processing, such as A/D conversion, on the image data outputted from the imaging element.

The camera monitor 120 is a liquid crystal display, for example, and displays an image which display-use image data indicate, for example. Display-use image data is generated by the camera controller 140. For example, display-use image data is data for displaying as an image the operation menus and imaging conditions of the digital camera 300, image data that has undergone image processing, and so forth. The camera monitor 120 can selectively display both still and moving pictures.

The camera monitor 120 is provided to the camera body 100. In this embodiment the camera monitor 120 is disposed on the back of the camera body 100, but may be disposed anywhere on the camera body 100.

The camera monitor 120 is an example of a display component provided to the camera body 100. Alternatively, the display component can be an organic EL device, an inorganic EL device, a plasma display panel, or any other device capable of displaying an image. The display component may be provided on the upper face, a side face, or some other place instead of the back of the camera body 100.

The interface unit 130 is operated by the user. More specifically, the interface unit 130 includes release button 131 for receiving focal plane shutter operation by the user, and a power switch 132 that is a rotary dial provided on the upper face of the camera body 100. The interface unit 130 can consist of buttons, levers, dials, a touch panel, or anything else that can be operated by a user.

The camera controller 140 (an example of a controller) controls the various components of the camera body 100. The camera controller 140 receives instructions from the interface unit 130. The camera controller 140 sends signals for controlling the lens unit 200 through a lens mount 250 and the body mount 150 to a lens controller 240, and indirectly controls the various components of the lens unit 200. In other words, the camera controller 140 controls the entire digital camera 300.

The camera controller 140 controls the CMOS circuit board 113. More specifically, the camera controller 140 sends a control signal to the CMOS circuit board 113, and the CMOS circuit board 113 controls the CMOS image sensor 110 based on the received control signal. That is, the camera controller 140 controls the CMOS image sensor 110. The camera controller 140 also acquires image data that has been produced by the CMOS image sensor 110 and that has undergone predetermined processing such as A/D conversion by CMOS circuit board 113, and performs further processing. For instance, the camera controller 140 produces display-use image data, recording-use moving picture data, and so forth from the image data processed by the CMOS circuit board 113.

The card slot 170 can accept the memory card 171. The card slot 170 controls the memory card 171 on the basis of a control signal transmitted from the camera controller 140. More specifically, the card slot 170 stores image data on the memory card 171. The card slot 170 outputs image data from the memory card 171. The card slot 170 also stores moving picture data on the memory card 171. The card slot 170 outputs moving picture data from the memory card 171.

The memory card 171 can store image data produced by image processing by the camera controller 140. For example, the memory card 171 can store compressed JPEG image files or uncompressed (raw) image files. The memory card 171 can also output, via the card slot 170, image files or image data internally stored ahead of time. Image files or image data outputted from the memory card 171 is subjected to image processing by the camera controller 140. For example, the camera controller 140 subjects image files or image data acquired from the memory card 171 to expansion processing to produce display-use image data.

The memory card 171 can also store moving picture data produced by image processing by the camera controller 140. For example, the memory card 171 can store moving picture files that have been compressed according to H.264/AVC, which is a moving picture compression standard. The memory card 171 can also output, via the card slot 170, moving picture files or moving picture data internally stored ahead of time. The moving picture files or moving picture data outputted from the memory card 171 is subjected to image processing by the camera controller 140. For example, the camera controller 140 subjects the moving picture files or moving picture data acquired from the memory card 171 to expansion processing and produces display-use moving picture data.

The memory card 171 is an example of a memory component. The memory component may be one that can be mounted to the camera body 100, such as the memory card 171, or may be one that is fixed to the digital camera 300.

The power supply 160 supplies electrical power to the various components for use by the digital camera 300. The power supply 160 may, for example, be a dry cell, or may be a rechargeable cell. The power supply 160 may also be a unit that receives power from the outside via a power cord or the like, and supplies this power to the digital camera 300.

The body mount 150 engages with lens mount 250. The body mount 150 supports the lens unit 200. The lens mount 250 and body mount 150 can be electrically connected. The camera body 100 can send and receive data and/or control signals to and from the lens unit 200 via the body mount 150 and the lens mount 250.

The focal plane shutter device 2 is disposed on the front side of the CMOS image sensor 110 (subject side), and controls the exposure time of the CMOS image sensor 110. The focal plane shutter device 2 has a state in which light going from an optical system L toward the CMOS image sensor 110 is blocked (closed state), and a state in which light going from the optical system L toward the CMOS image sensor 110 is transmitted (open state). The focal plane shutter device 2 will be discussed below.

The shutter charging device 1 performs a charging operation on the focal plane shutter device 2. As will be described later in detail, the shutter charging device 1 generates a biasing force to move a second curtain blade 24 and a first curtain blade 25 of the focal plane shutter device 2.

The lens unit 200 can be mounted to the camera body 100, and forms an optical image of a subject. More specifically, the lens unit 200 has the optical system L, a driver 215, the lens mount 250, the lens controller 240, and a lens barrel 260.

The optical system L forms an optical image of a subject on the light receiving surface of the CMOS image sensor 110.

The lens controller 240 controls the entire lens unit 200 on the basis of control signals sent from the camera controller 140.

2. Overview of Focal Plane Shutter Device

Figure 6:
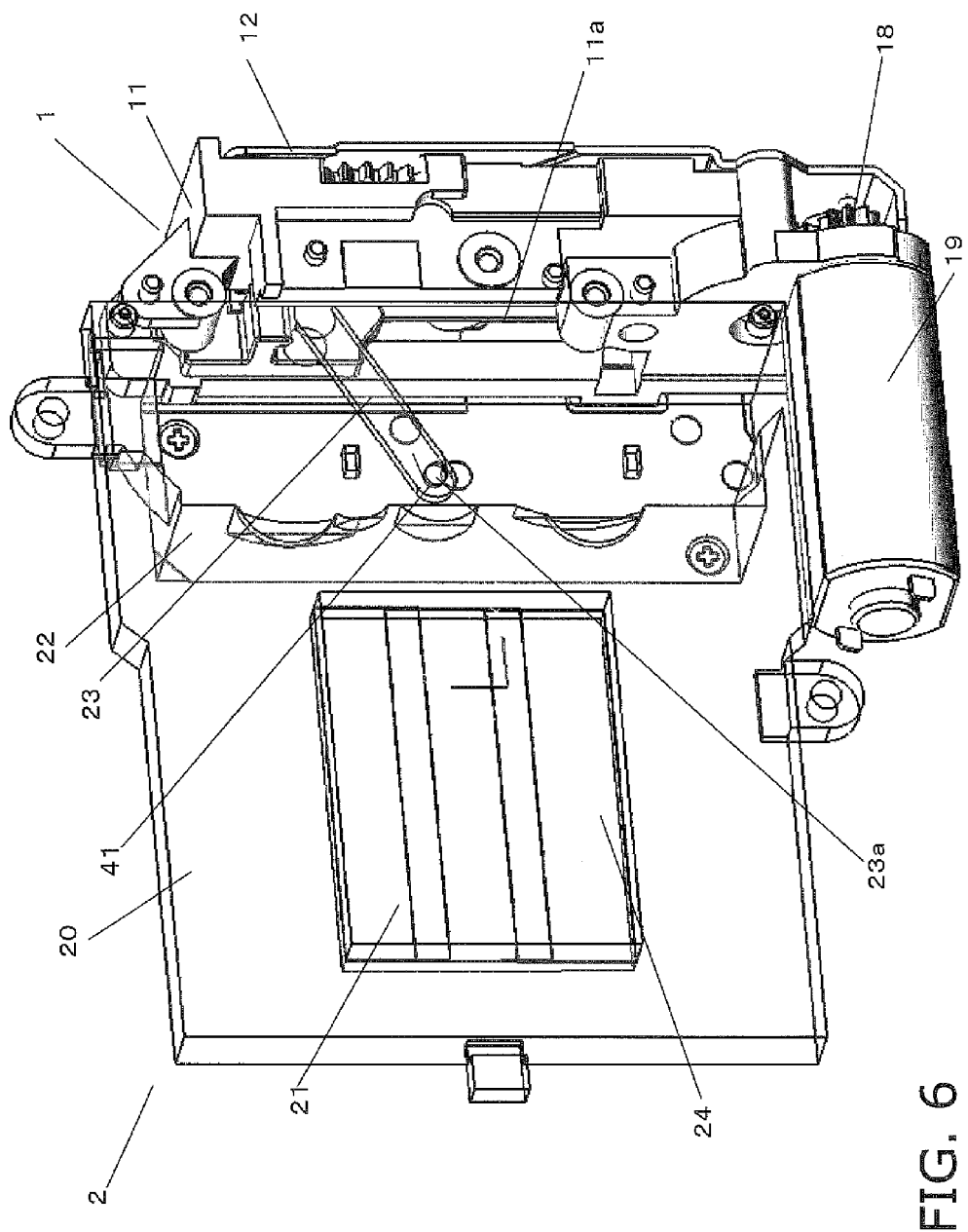
FIG. 6 is an oblique view of the shutter charging device 1 and the focal plane shutter device 2 in Embodiment 1.
Figure 10:
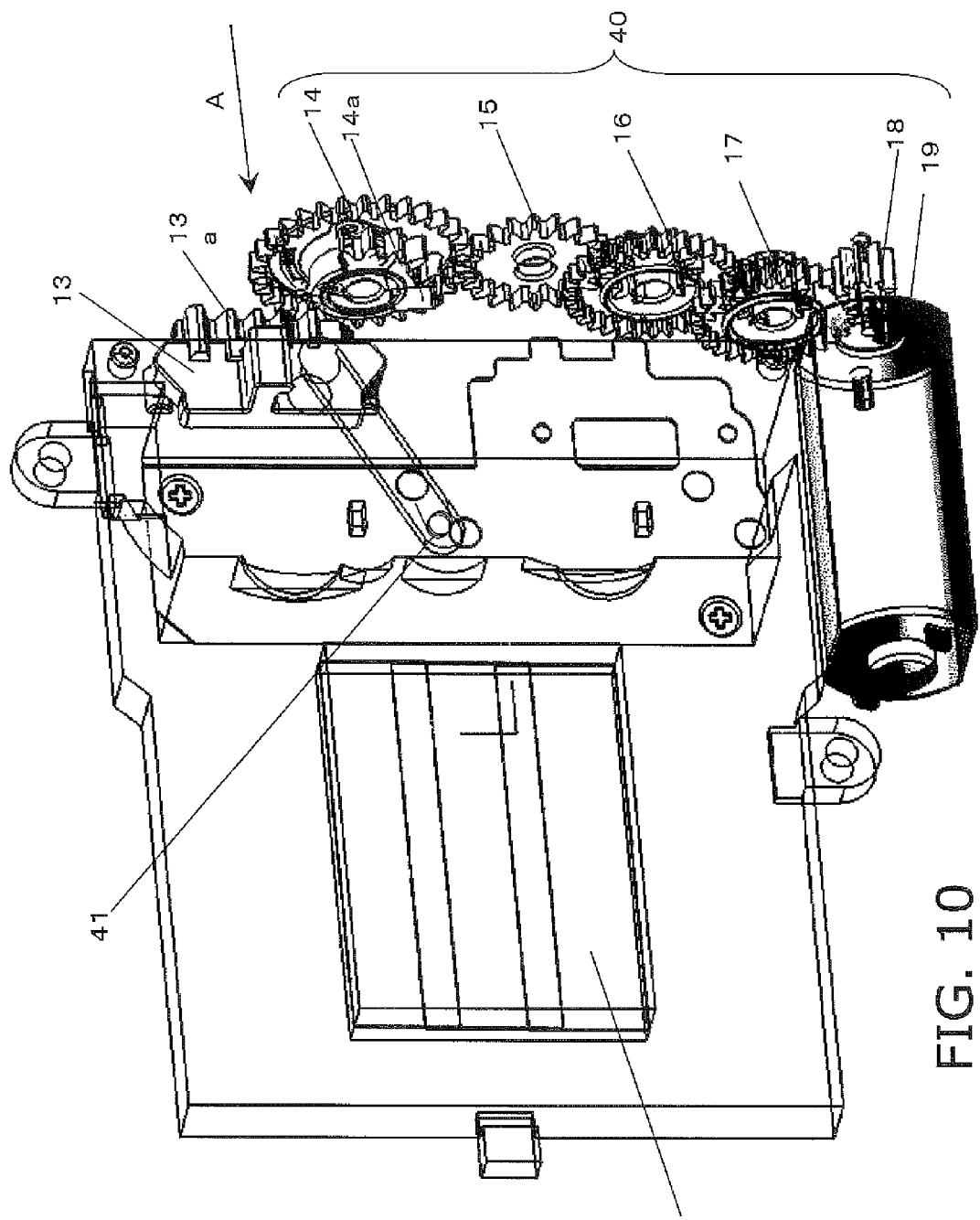
FIG. 10 is an oblique view of the drive state of the shutter charging device in Embodiment 1.
Figures 11A, 11B:
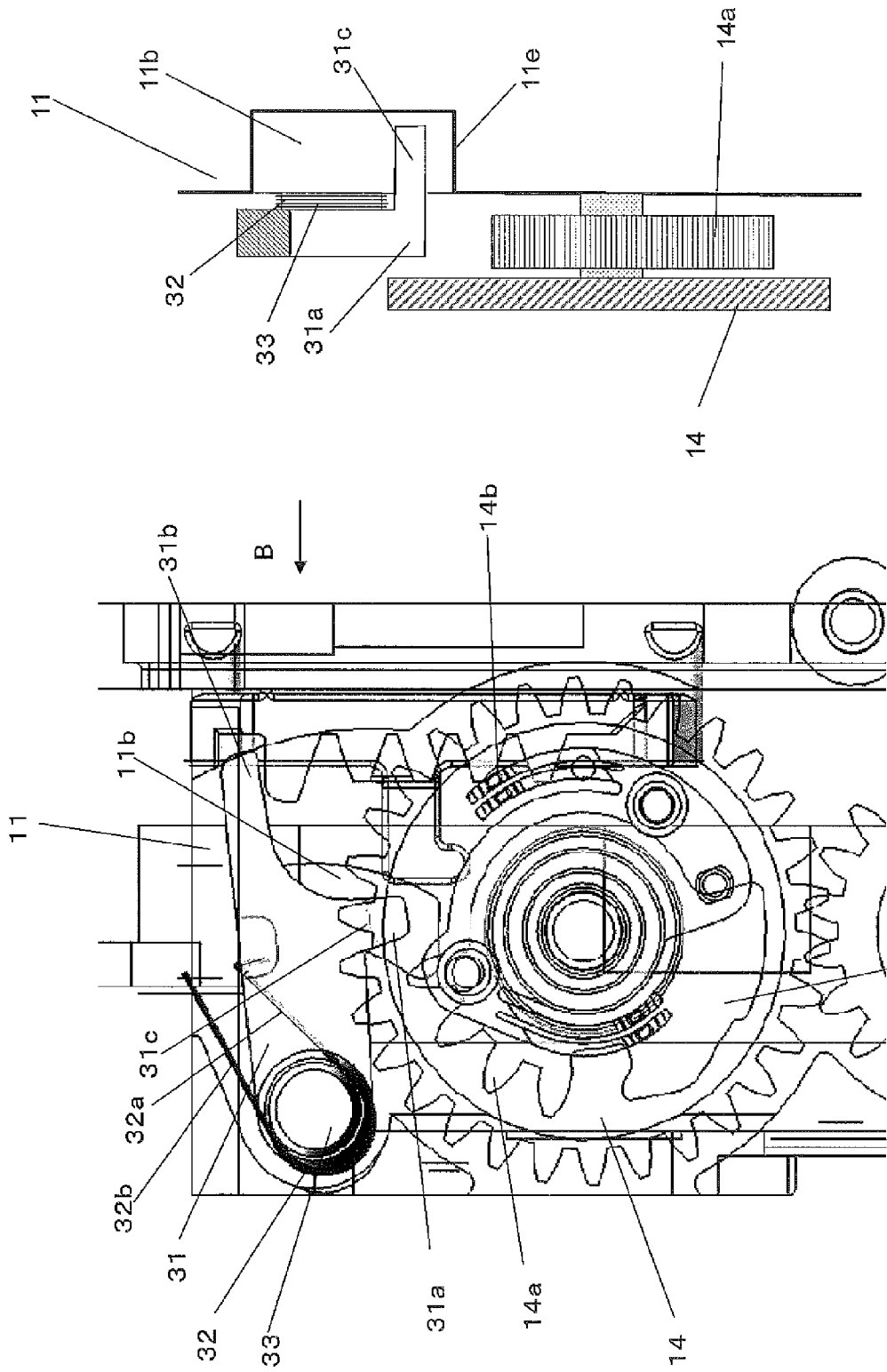
FIG. 11A is a side view of the main components of the shutter charging device in Embodiment 1.
FIG. 11B is a simplified cross section in the arrow B direction in FIG. 11A.

FIG. 6 is an oblique view of the shutter charging device 1 and the focal plane shutter device 2 in Embodiment 1. FIGS. 7 to 10 are oblique views of the drive state, with just the drive members of the shutter charging device in Embodiment 1 highlighted. FIG. 11A is a side view of the main components of the shutter charging device 1 in Embodiment 1, and FIG. 11B is a view in the arrow B direction in FIG. 11A.

The focal plane shutter device 2 has a shutter base plate 20 provided with an opening 21, the first curtain blade 25 (an example of a first curtain) that is able to move between a position at which the opening 21 is covered and a position of being retracted downward from the opening 21, and a first elastic member (not shown) for generating a biasing force to move the first curtain blade 25 in the direction of retracting downward from the opening 21.

The focal plane shutter device 2 also has the second curtain blade 24 (an example of a second curtain) that is able to move between a position at which the opening 21 is covered and a position of being retracted upward from the opening 21, and a second elastic member (not shown) for generating a biasing force to move the second curtain blade 24 in the direction of covering the opening 21.

The focal plane shutter device 2 further has a charge lever 23 for applying a biasing force to the first elastic member and the second elastic member, a first curtain locking mechanism (not shown) that maintains a state in which the first curtain blade 25 is retracted from the opening 21 when the charge lever 23 applies a biasing force to the first elastic member, and a second curtain locking mechanism (not shown) that maintains a state in which the second curtain blade 24 covers the opening 21 when the charge lever 23 applies a biasing force to the second elastic member. The above-mentioned members that are not shown and the charge lever 23 are disposed in a shutter driving mechanism 22.

Figure 7:
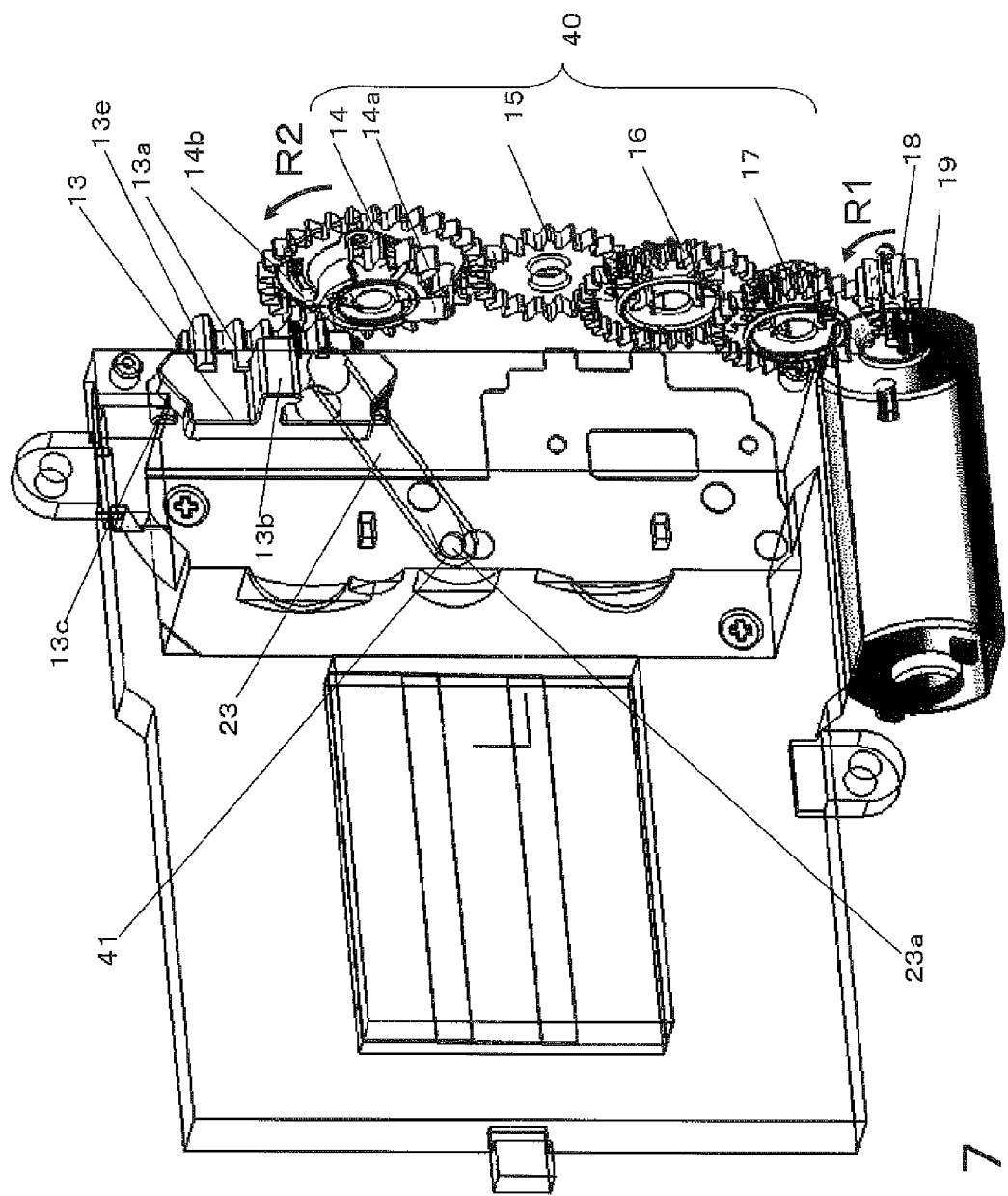
FIG. 7 is an oblique view of the drive state of the shutter charging device in Embodiment 1.
Figure 8:
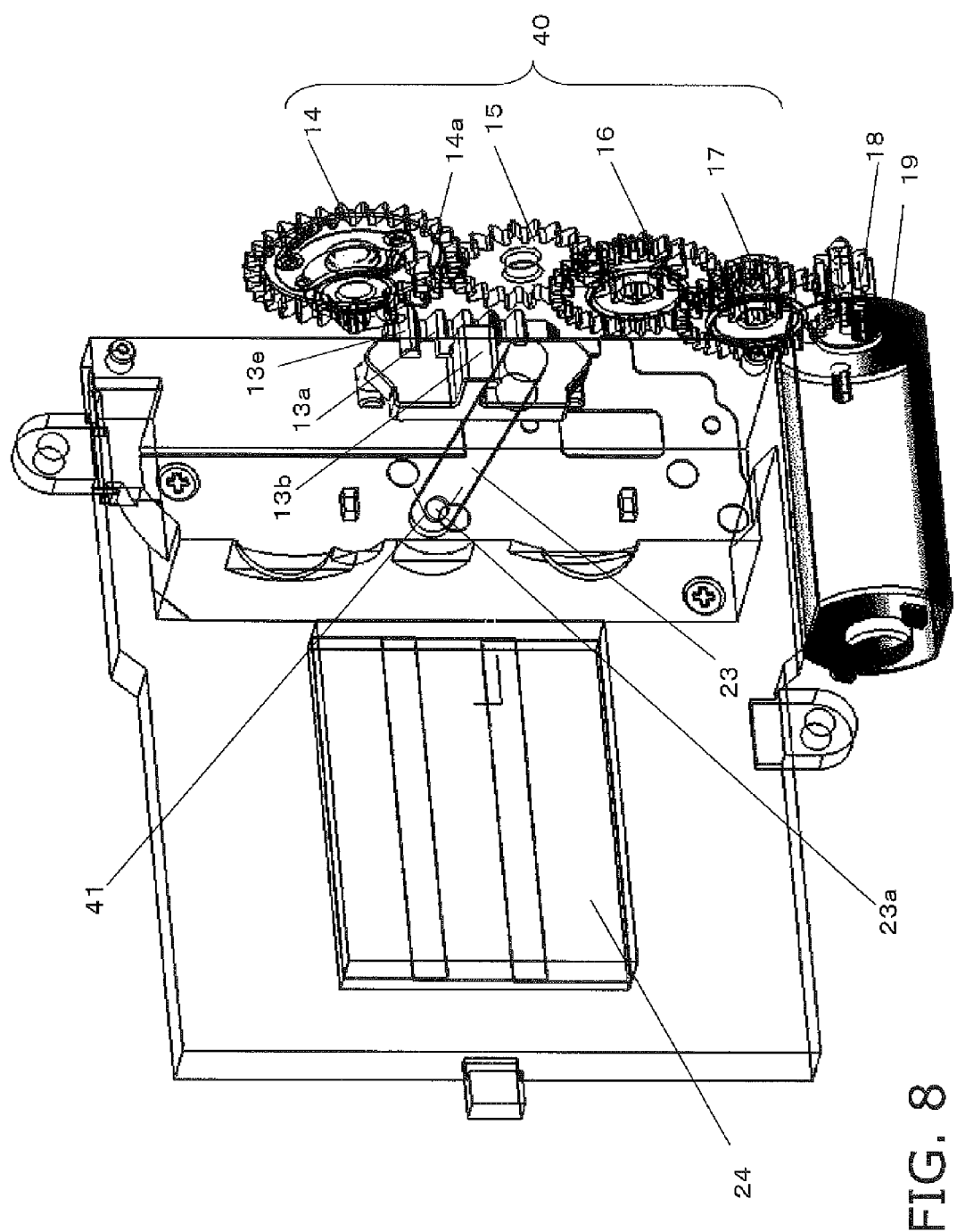
FIG. 8 is an oblique view of the drive state of the shutter charging device in Embodiment 1.

As shown in FIGS. 7 and 8, a biasing force capable of releasing the second curtain blade 24 and the first curtain blade 25 can be applied to the first elastic member and the second elastic member by rotating the charge lever 23 downward (in the drawing) around a rotary shaft 23a. The configuration at the charging end of the charge lever 23 is such that the first curtain blade 25 is held in an open state (a state of being retracted from the opening 21) by the first curtain locking mechanism in the shutter driving mechanism 22. Therefore, the focal plane shutter device 2 functions as a normally open type of focal plane shutter device.

In the above state, when an electromagnetic device (not shown) holds the second curtain blade 24 and the first curtain blade 25 in a state of being retracted from the opening 21, and the charge lever 23 returns from the state in FIG. 8 to the state in FIG. 7, the first curtain locking mechanism is unlocked, the first curtain blade 25 blocks the opening 21, and the device is in an imaging standby state.

Upon completion of exposure using the second curtain blade 24 and the first curtain blade 25, in the charging of the second curtain blade 24 and the first curtain blade 25, a state can be maintained in which the first curtain blade 25 is retracted by the first curtain locking mechanism, while the opening 21 is blocked by the second curtain blade 24 with the second curtain locking mechanism.

Therefore, it is possible to read out image data from the imaging element in parallel with the charging of the second curtain blade 24 and the first curtain blade 25 in a state in which the first curtain blade 25 has been retracted.

Figure 16:
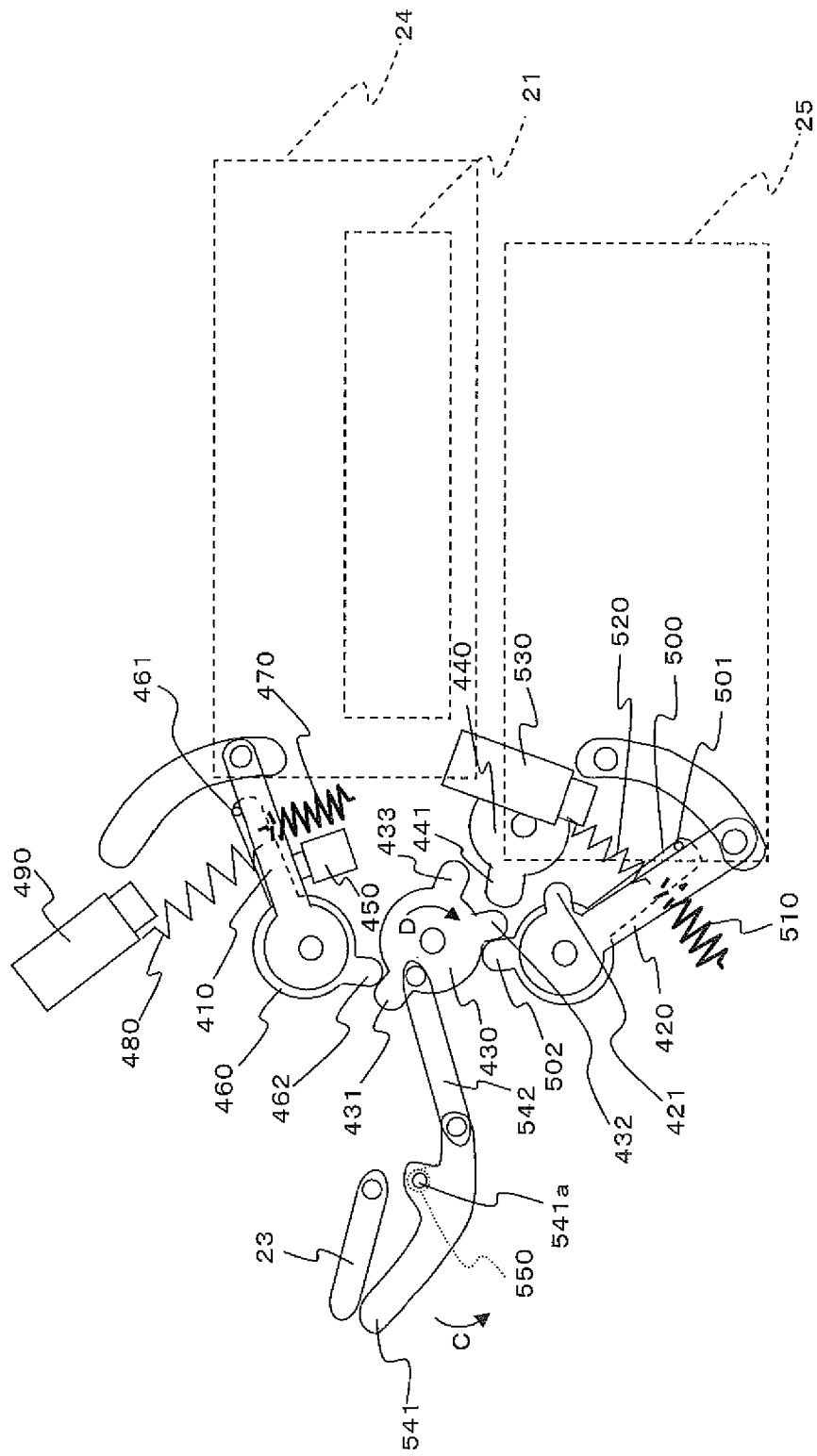
FIG. 16 is a simplified diagram of the focal plane shutter device in Embodiment 1.

The configuration of the focal plane shutter device 2 will now be described further. FIG. 16 is a simplified diagram illustrating the configuration of the focal plane shutter device 2 in this embodiment. As shown in FIG. 16, the focal plane shutter device 2 is provided with a second curtain drive pin 410 that is linked to the second curtain blade 24 in order to drive the second curtain blade 24, a first curtain drive pin 420 that is linked to the first curtain blade 25 in order to drive the first curtain blade 25, a first cam 430, and a second cam 440. In this simplified diagram, the second curtain blade 24 and the first curtain blade 25 do not change in shape between the position where they are blocking the opening 21 and the position where they are retracted from the opening 21, but the configuration may be such that three of the second curtain blades 24 and the first curtain blades 25 are provided, which overlap in the retracted position so that the overall width up and down is shorter.

A second curtain auxiliary drive pin 460 is provided on the lower side (the side away from the viewer in the drawings) of the second curtain drive pin 410, and a contact part 461 that comes into contact with the second curtain drive pin 410 is provided to the distal end of the second curtain auxiliary drive pin 460. Also provided are a second curtain movement spring member 470 (an example of the above-mentioned second elastic member) that is linked to the second curtain auxiliary drive pin 460, to bias the second curtain auxiliary drive pin 460 downward, and a spring member 480 that is linked to the second curtain drive pin 410, to bias the second curtain drive pin 410 upward. Also, a solenoid 450 is provided for holding the second curtain drive pin 410 at a lower position, and a solenoid 490 is provided for holding the second curtain auxiliary drive pin 460 at an upper position. The second curtain movement spring member 470 is set to have a stronger biasing force than the spring member 480.

A first curtain auxiliary drive pin 500 is provided on the lower side (the side away from the viewer in the drawings) of the first curtain drive pin 420, and a contact part 501 that comes into contact with the first curtain drive pin 420 is provided to the distal end of the first curtain auxiliary drive pin 500. Also provided are a first curtain movement spring member 510 (an example of the above-mentioned first elastic member) that is linked to the first curtain auxiliary drive pin 500, to bias the first curtain auxiliary drive pin 500 downward, and a spring member 520 that is linked to the first curtain drive pin 420, to bias the first curtain drive pin 420 upward. Also, a solenoid 530 is provided for holding the first curtain auxiliary drive pin 500 at an upper position. The first curtain movement spring member 510 is set to have a stronger biasing force than the spring member 520.

A first connecting arm 541 that comes into contact with the distal end of the charge lever 23, and a second connecting arm 542 that links the first cam 430 and the first connecting arm 541 are also provided. A spring member 550 is provided to a rotating shaft 541*a* so that the first connecting arm 541 will rotate clockwise around the rotating shaft 541*a*.

The state shown in FIG. 16 is the state after imaging is complete (after movement is complete), the opening 21 is covered by the second curtain blade 24, and the first curtain blade 25 has been retracted below the opening 21.

Figure 17:
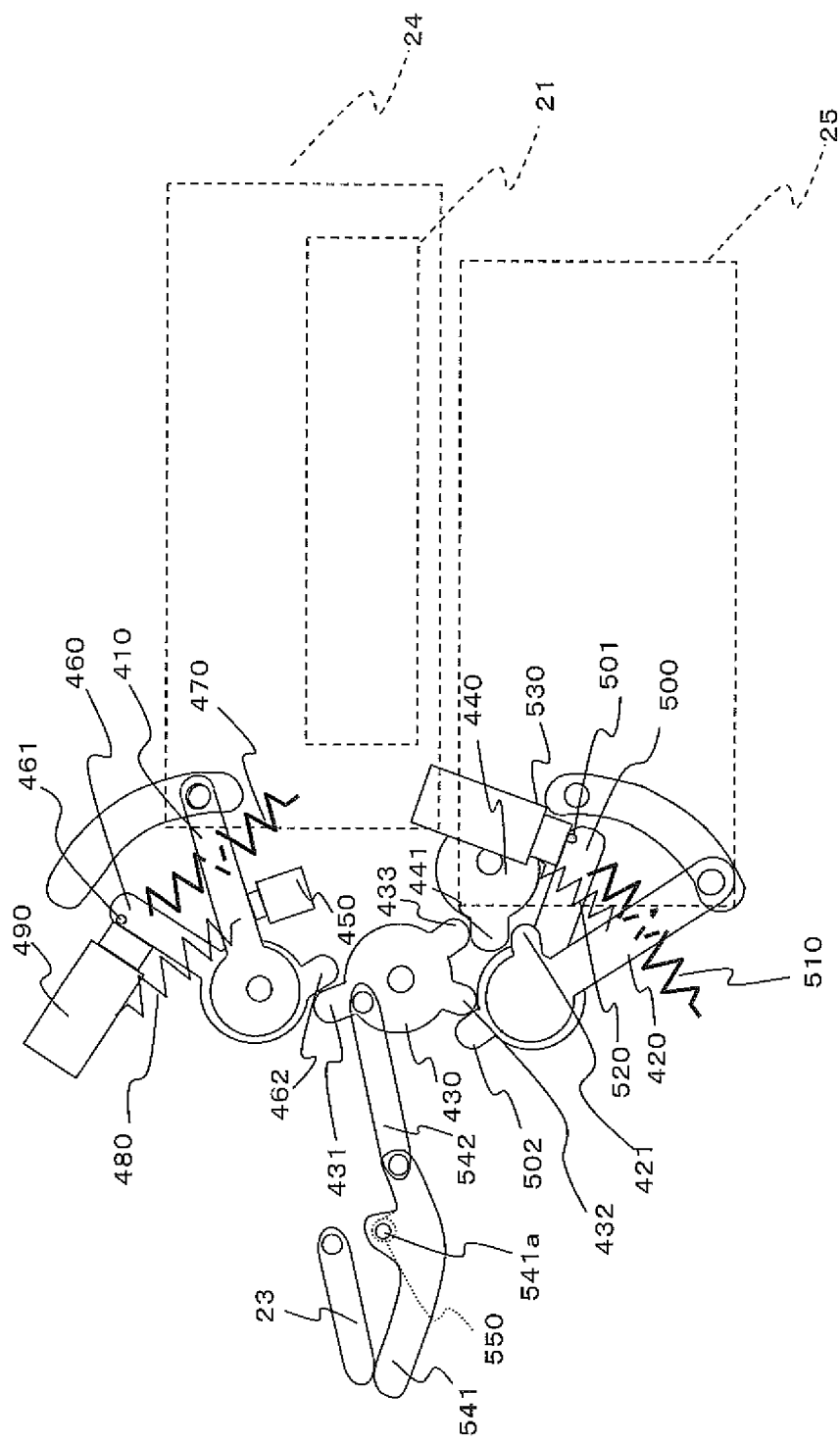
FIG. 17 is a simplified diagram of the focal plane shutter device in Embodiment 1.

Next, in order to perform the charging operation, the DC motor 19, the gear component, a charging member 13, and so forth (discussed below) are actuated to rotate the charge lever 23 downward, whereupon the end of the first connecting arm 541 also rotates downward (arrow C direction), and the first cam 430 is pushed by the second connecting arm 542 and rotates clockwise (along arrow D). At this point a first protrusion 431 of the first cam 430 contacts a protrusion 462 of the second curtain auxiliary drive pin 460, and a second protrusion 432 of the first cam 430 contacts a protrusion 502 of the first curtain auxiliary drive pin 500, so the rotation of the first cam 430 causes the second curtain auxiliary drive pin 460 and the first curtain auxiliary drive pin 500 to rotate upward as shown in FIG. 17. Because of the upward rotation of the first curtain auxiliary drive pin 500, the first curtain drive pin 420 also tries to rotate upward under the biasing force of the spring member 520. However, a protrusion 441 of the second cam 440 and a third protrusion 433 of the first cam 430 come into contact. Therefore, the second cam 440 also rotates along with the rotation of the first cam 430, and the protrusion 441 of the second cam 440 is disposed along the rotational path of a protrusion 421 of the first curtain drive pin 420, which restricts the upward rotation of the first curtain drive pin 420. This second cam 440 corresponds to an example of the above-mentioned first curtain locking mechanism.

Also, because of the upward rotation of the second curtain auxiliary drive pin 460, the second curtain drive pin 410 also tries to rotate upward under the biasing force of the spring member 480, but is electromagnetically fixed at its lower position by the solenoid 450. This solenoid 450 corresponds to an example of the above-mentioned second curtain locking mechanism. This second curtain locking mechanism may also be constituted by a cam or the like, as with first curtain locking mechanism.

Figure 18:
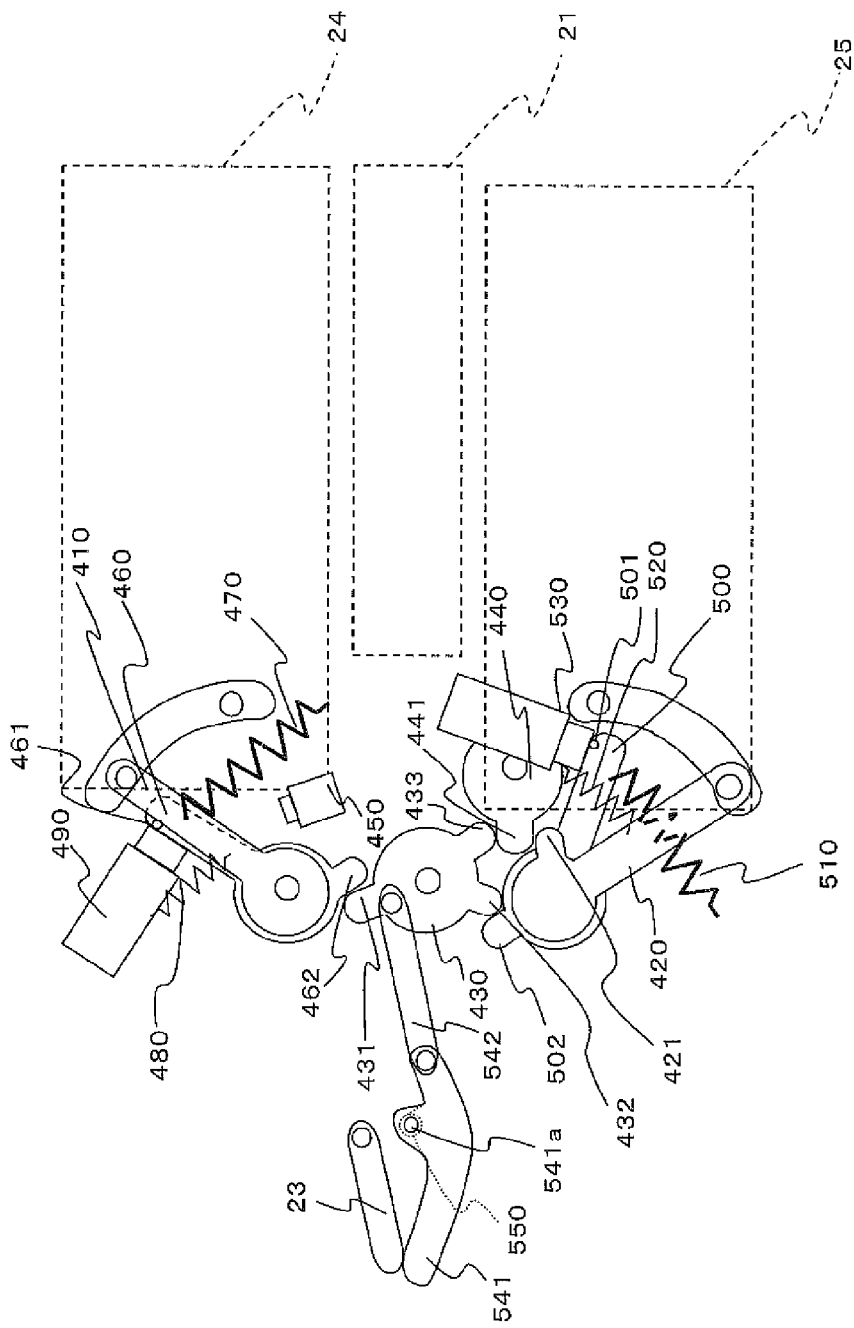
FIG. 18 is a simplified diagram of the focal plane shutter device in Embodiment 1.

Upon completion of charging, the supply of power to the solenoid 450 is stopped, and the biasing force of the spring member 480 causes the second curtain drive pin 410 to rotate upward, and the second curtain blade 24 to move above the opening 21, as shown in FIG. 18. This makes live view possible, without the opening 21 being covered by the first curtain blade 25 or the second curtain blade 24.

Figure 19:
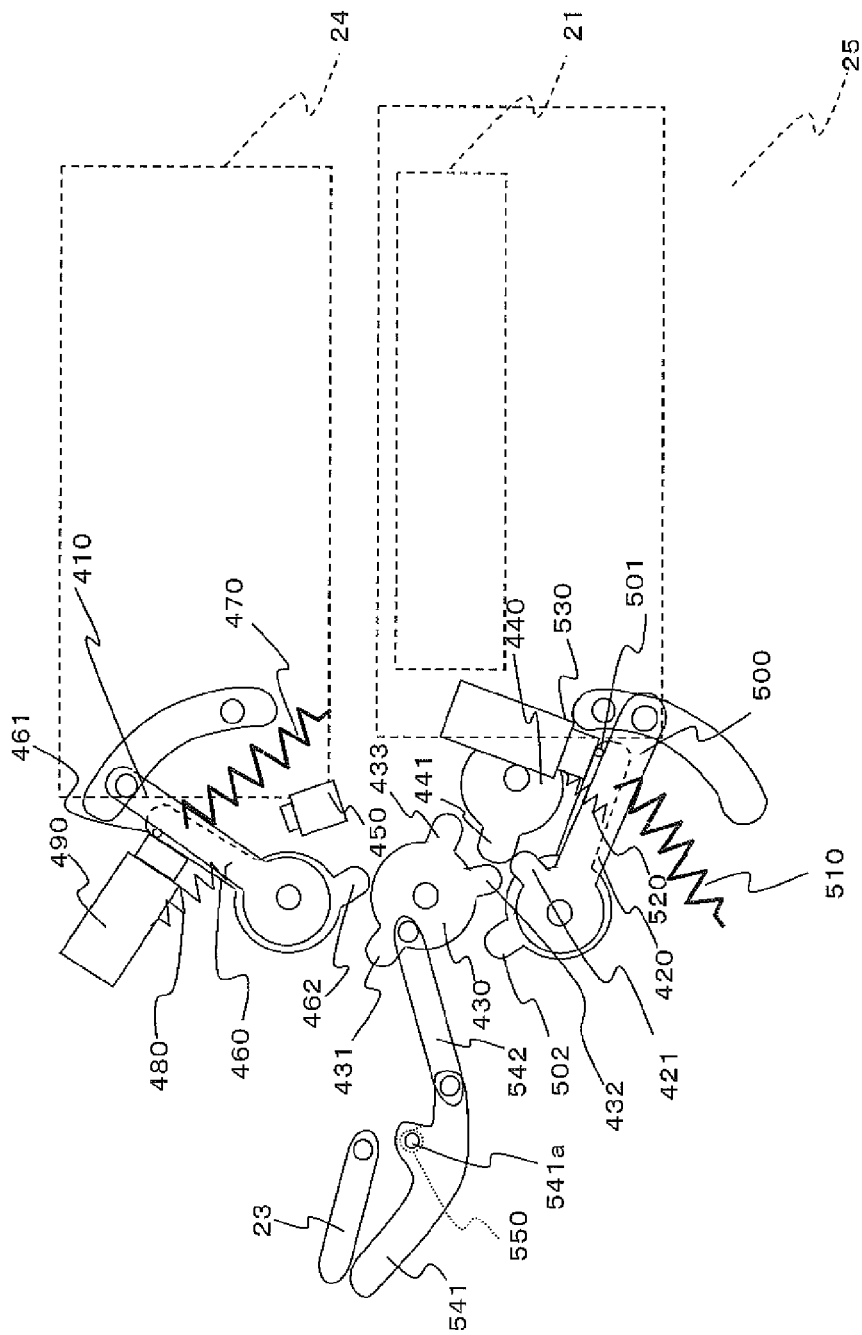
FIG. 19 is a simplified diagram of the focal plane shutter device in Embodiment 1.

After this, the biasing force of a charge lever spring 41 (discussed below) rotates the charge lever 23 upward, and the spring member 550 causes the first connecting arm 541 to rotate clockwise. This rotation pulls the second coupling member 542 to the left, and the first cam 430 rotates counterclockwise. The third protrusion 433, which has been holding down the protrusion 441 from above, rotates counterclockwise along with the rotation of the first cam 430. When the rotation of the third protrusion 433 releases the pressure on the protrusion 441 from above by the third protrusion 433, the elastic force of the spring member 520 causes the first curtain drive pin 420 to rotate counterclockwise while its protrusion 421 pushes the protrusion 441 upward and causes the second cam 440 to rotate clockwise, as shown in FIGS. 18 and 19.

Thus, the first curtain drive pin 420 rotates upward under the biasing force of the spring member 520, resulting in a state in which the opening 21 is blocked by the first curtain blade 25, which is an imaging standby state. FIGS. 16 to 19 are schematic views, and the cam shape and configuration, etc., can be variously modified. For example, the various members and so forth may be provided to the rotating shaft of a drive pin.

3. Shutter Charging Device

The shutter charging device pertaining to Embodiment 1 will now be described through reference to FIGS. 6 to 14.

3-1. Summary of Shutter Charging Device

An overview of the shutter charging device in Embodiment 1 will be described through reference to FIGS. 6 to 14. FIG. 6 shows a charging standby state in which the focal plane shutter device has already been exposed. Therefore, the opening 21 is covered by the second curtain blade 24.

The shutter charging device 1 has a DC motor 19 fixed to charging base plate 11. A pinion gear 18 is fixed to the output shaft of the DC motor 19. The gear component 40 shown in FIG. 7 comprises a step gear 17, a step gear 16, an idle gear 15, and a drive gear 14. The pinion gear 18 meshes with the step gear 17, and the step gear 17 meshes with the step gear 16, which reduces the rotational speed of the DC motor 19. The step gear 16 meshes with the drive gear 14 via the idle gear 15. As shown in FIGS. 6 and 7, the gear component 40 is held down by a retainer plate 12 on the charging base plate 11 so that its gears can rotate.

The drive gear 14 has a skip-tooth part 14a, allowing it to mesh with a rack gear 13a of the charging member 13 (corresponds to an example of a driver). The charging member 13 is fitted into a guide groove 11a of the charging base plate 11 by a guide hook 13c, and is thereby guided movably in the up and down direction in the drawings (see FIGS. 6 and 7).

As shown in FIG. 7, an encoder contact 14b is integrally attached to the drive gear 14. The encoder contact 14b is a conductor, and by rotating in contact with an encoder board (not shown) affixed to the retainer plate 12, it allows the position of the drive gear 14 to be detected.

The focal plane shutter device 2 and the charging base plate 11 are fastened by screws. The focal plane shutter device 2 has the opening 21, and the second curtain 24 and the first curtain blade 25 are disposed so that they can block off the opening 21. The focal plane shutter device 2 also has the shutter driving mechanism 22 and the charge lever 23. The charge lever 23 is biased upward in the drawings by the charge lever spring 41.

A charging component 13b of the charging member 13 contacts the charge lever 23 of the focal plane shutter device 2, and therefore receives the upward biasing force of the charge lever 23.

The shutter charging device 1 in Embodiment 1 further comprises a lock lever 31 provided above the drive gear 14, to stop the drive gear 14.

3-2. Configuration of Lock Lever 31

The shutter charging device including the lock lever 31 of Embodiment 1 will be described in detail through reference to FIGS. 11A and 11B. FIG. 11A is an enlargement side view of the main components of the shutter charging device of Embodiment 1. FIG. 11B is a cross section of the arrow B side in FIG. 11A.

The following embodiments are exemplary embodiments of the present disclosure, and the present disclosure is not limited to or by these embodiments.

FIGS. 11A and 11B show the configuration of the shutter charging device illustrated in FIGS. 6 to 10, with some of the functions omitted (such as the lock lever 31). Other than these functions, everything is exactly the same as in FIGS. 6 to 10. The following description will focus on these functions.

The lock lever 31 (corresponds to an example of a brake member) is rotatably supported by a shaft 33 on the charging base plate 11. The shaft 33 is provided parallel to the direction of the rotational axis of the DC motor 19 and the drive gear 14. A spring 32 is passed through to the shaft 33, an arm portion 32a is engaged with the lock lever 31, and an arm portion 32b at the other end comes into contact with the charging base plate 11. Therefore, the lock lever 31 is biased downward in the figure (clockwise) by the spring 32.

The lock lever 31 has a protrusion 31a which can enter the rotational path of the skip-tooth part 14a of the drive gear 14, and a protrusion 31b that can enter the path of a final gear tooth 13e of the rack gear 13a of the charging member 13.

As shown in FIG. 11B, a protrusion 31c extends from the second face of the protrusion 31a (the side away from the viewer in the drawings), and fits into a recess 11b that is recessed away from the viewer in the drawings in the charging base plate 11. Since the protrusion 31c fits into the recess 11b, and is able to move only within the recess 11b, the lock lever 31 is able to rotate only within a predetermined angular range around the shaft 33.

3-3. Summary of Charging Operation of Shutter Charging Device

The operation of the lock lever 31 will not be described, but a summary of the charging operation will be described through reference to FIGS. 7 to 10.

After release is complete, when the DC motor 19 rotates counterclockwise (as viewed from the left side in the drawings; the direction of the arrow R1 in FIG. 7) under control by the camera controller 140, the pinion gear 18 rotates counterclockwise, this rotation is transmitted to the step gear 17, the step gear 16, the idle gear 15, and the drive gear 14, and counterclockwise (as viewed from the left side in the drawings; the direction of the arrow R2 in FIG. 7) rotational force is imparted to the drive gear 14.

When the drive gear 14 rotates counterclockwise, the skip-tooth part 14a meshes with the rack gear 13a of the charging member 13, and the charging member 13 is charge driven downward with respect to the charging base plate 11 (see FIG. 8).

Figure 9:
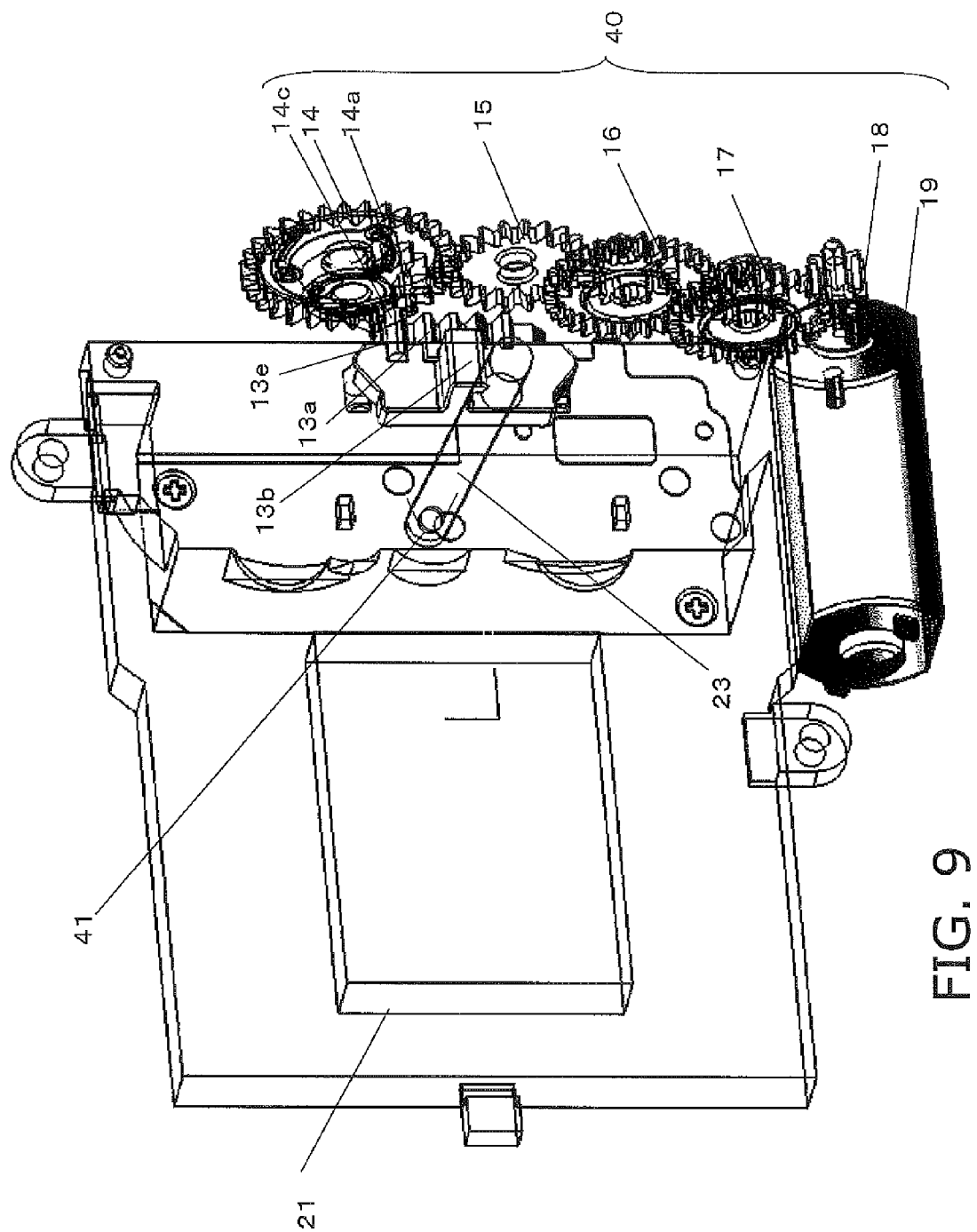
FIG. 9 is an oblique view of the drive state of the shutter charging device in Embodiment 1.

When the DC motor 19 further rotates counterclockwise, a flat cam portion 14c of the drive gear 14 comes into contact with the final gear tooth 13e (the uppermost gear tooth in the drawings) of the rack gear 13a of the charging member 13, which prevents the return of the charge lever 23 (see FIG. 9).

In the state in FIG. 9, the second curtain blade 24 is retracted from the opening 21, putting the opening 21 in an open state and allowing a subject image to be captured by the imaging element (see the CMOS image sensor 110 in FIG. 4). Therefore, if image data captured by the imaging element is displayed on the camera monitor 120 or a viewfinder, the user can look at the subject. In preparation for imaging, focal control of the imaging lens or exposure measurement based on the captured image data will be possible.

The user can then give a trigger for image capture by pressing a release button 131 or another such operation, and in response to this operation the camera controller 140 further rotates the DC motor 19 counterclockwise. The drive gear 14 is then rotated, and the cam flat portion 14c of the drive gear 14 is retracted from the path of the rack gear 13a. Consequently, the flat cam portion 14c and the rack gear 13a of the charging member 13 are no longer in contact, the charge lever 23 moves the charging member 13 upward (in the drawing) by means of the charge lever spring 41, returning to an imaging standby state (FIG. 10). Because the system is in an imaging standby state, the opening 21 is covered by the first curtain blade 25.

3-4. Description of Shutter Charging Device Issues

Issues will be described in detail through reference to FIGS. 12 and 13. FIGS. 12A to 12C are diagrams of a configuration in which the lock lever 31 shown in FIGS. 11A and 11B is not provided, and are views in the direction of arrow A in FIG. 10, indicating variance in the stop position after motor braking in the imaging standby state of the drive gear 14. FIG. 12B shows the stationary position of the drive gear 14 in the design nominal state, and FIGS. 12A and 12C show the stationary position of the drive gear 14 in states before and after the design nominal state. FIGS. 13A to 13C show the movement of the blades, and time charts in the various states in FIGS. 12A to 12C.

In the transition to the imaging standby state, the load of the charge lever 23 on the DC motor 19 via the charging member 13 is released, so the load on the DC motor 19 is extremely light in this state. Here, the motor characteristics and load characteristics will vary with the operating environment, and particularly the temperature, so even though the DC motor 19 is braked by short braking, etc., it is difficult to stop the drive gear 14 at the predetermined position shown in FIG. 12B.

For example, at high temperatures motor power tends to decrease, whereas mechanical load tends to be lighter. At low temperatures, motor power tends to increase, whereas mechanical load tends to be heavier. In terms of the above, motor power and load are in a relation such that they cancel out each other. However, it is difficult form a design perspective to keep the amount of change the same, and depending on individual differences and the environment, the stopping will occur in the range of FIGS. 12A to 12C before and after the design nominal state in FIG. 12B.

Therefore, the charging operation is started again after imaging is complete, but variance in the stop position of the drive gear 14 can cause deviation in the timing from the start of the charging operation until the skip-tooth part 14*a* of the drive gear 14 begins to mesh with the rack gear 13*a* of the charging member 13.

Figure 13A:
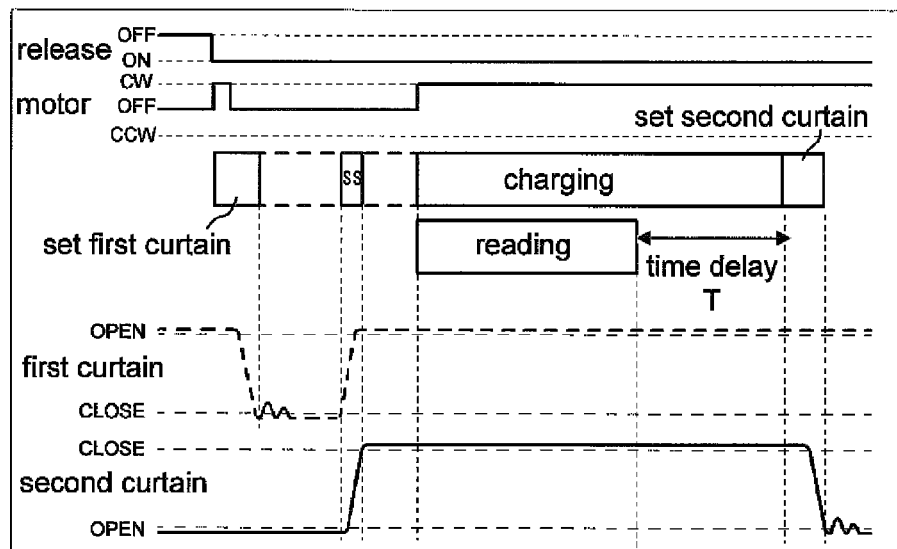
FIGS. 13A to 13C are time charts and diagrams of vane operation in the various states in FIGS. 11A to 11C.
Figure 13B:
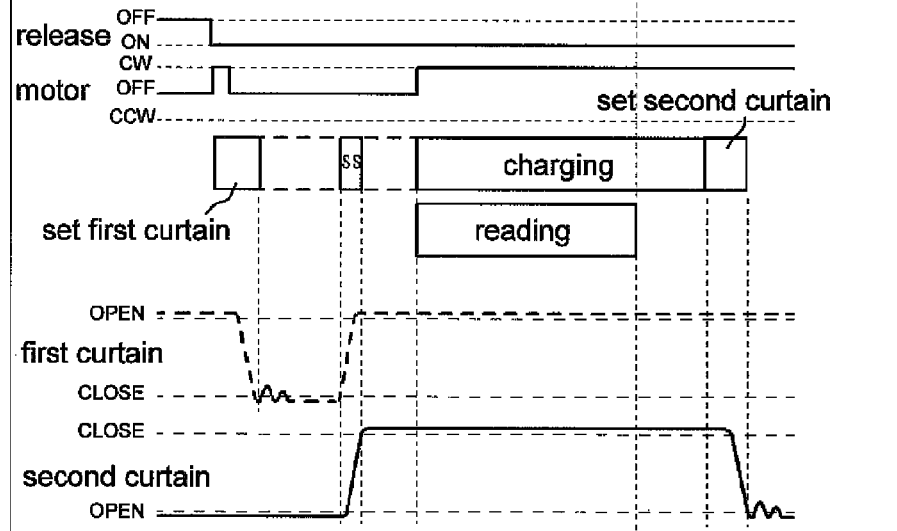
Figure 13C:
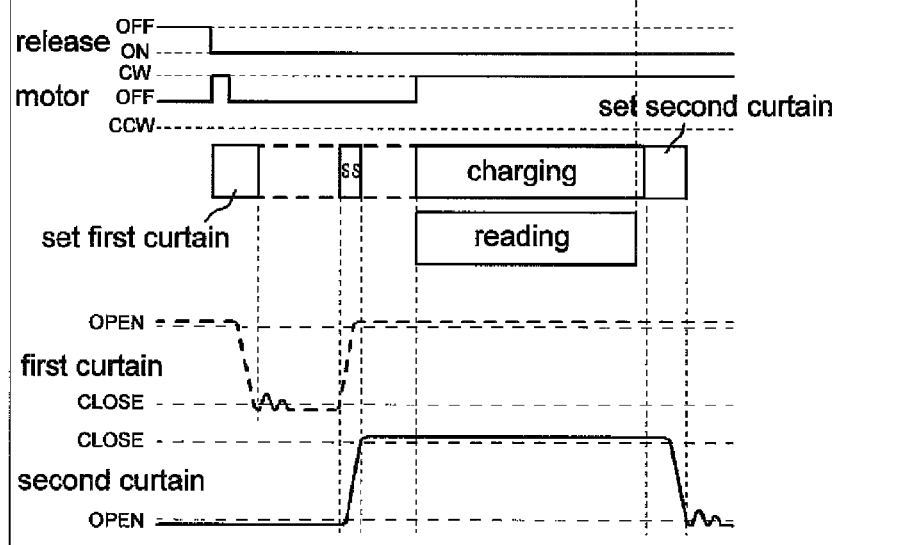

As a result, when the drive gear 14 is charge driven from the state in FIG. 12A, the idling time until the drive gear 14 meshes with the charging member 13 will be longer than the charging time shown in FIG. 13B in the design nominal state in FIG. 12B, and the charging time ends up being longer as shown in FIG. 13A. On the other hand, when the drive gear 14 is charge driven from the state in FIG. 12C, the idling time until the drive gear 14 meshes with the charging member 13 is shorter, and the charging time ends up being shorter as shown in FIG. 13C.

It is necessary for the second curtain blade 24 to block off the opening 21 during the reading of image data from the imaging element. Therefore, the charging operation must be completed after the reading of image data is completed, so the image data reading time must be set to within the charging time in one of FIGS. 12A to 12C. Therefore, control of the camera must be carried out according to the time chart of FIG. 12A, always keeping a time delay T in mind, and in light of the state in FIG. 12C.

Accordingly, the time delay T must always be added in one sequence, so the imaging interval ends up being extended in continuous capture.

3-5. Charging Operation of Shutter Charging Device

Figure 14A:
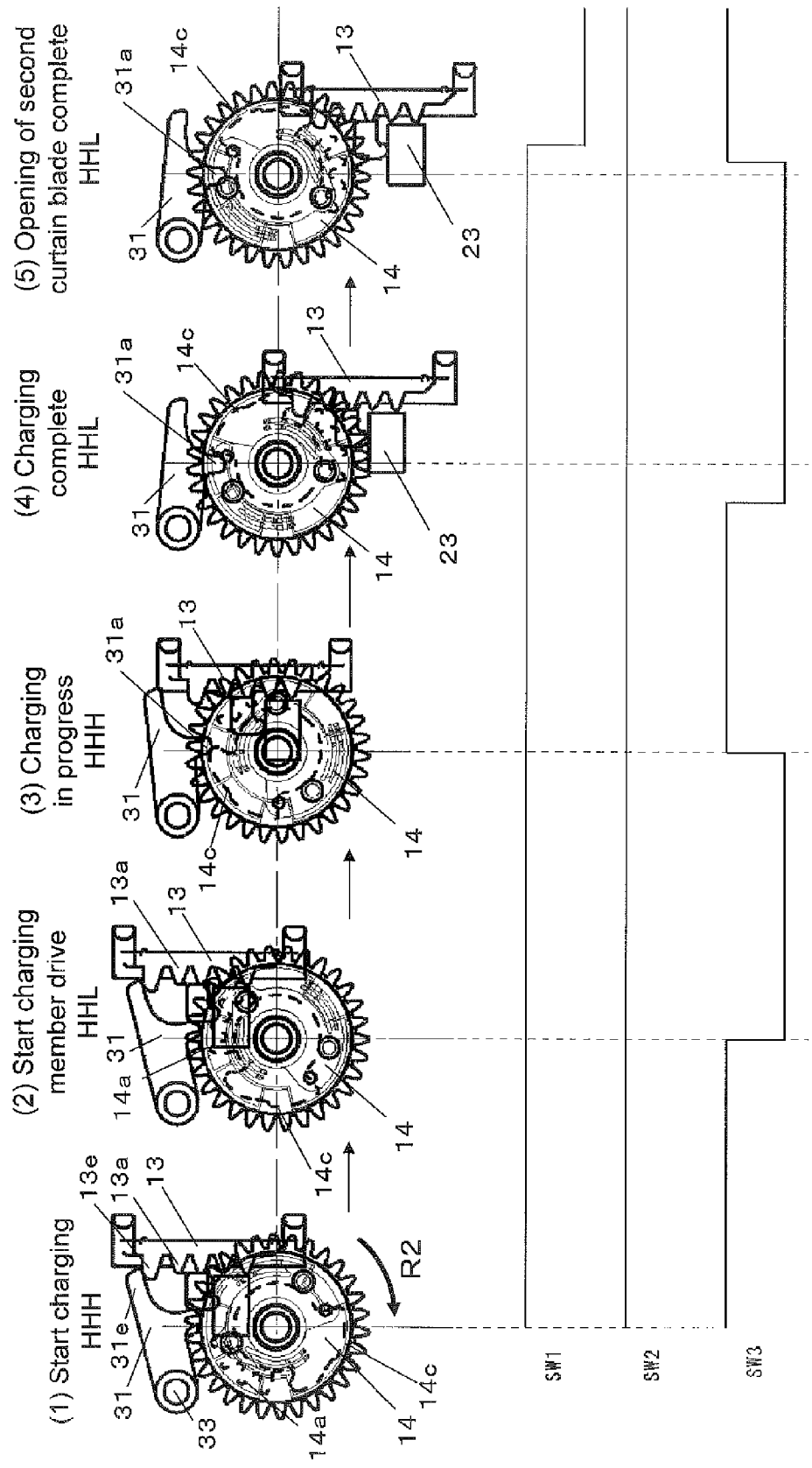
FIG. 14A is a transition diagram of the drive of the main components of the shutter charging device 1 in Embodiment 1.
Figure 14B:
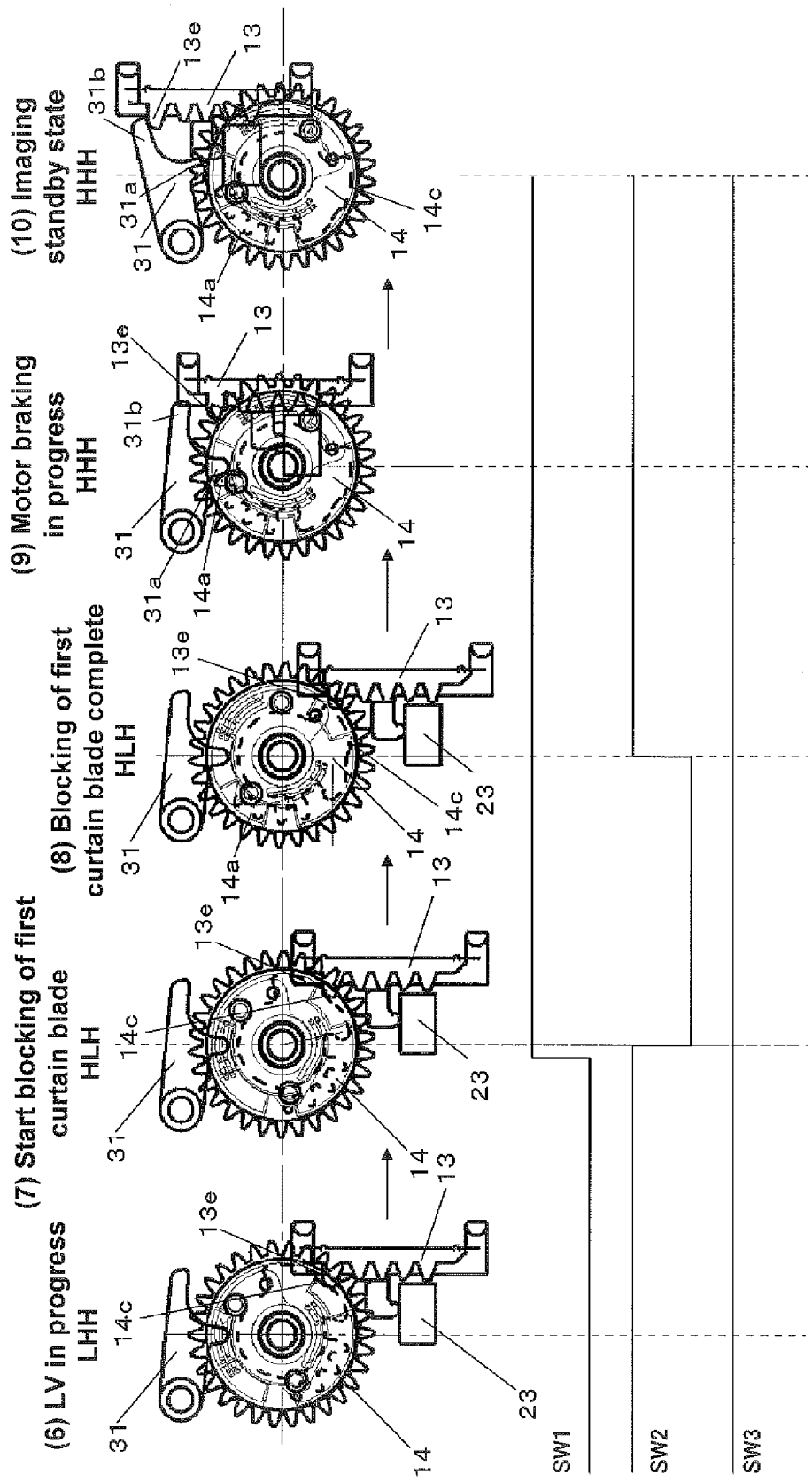
FIG. 14B is a transition diagram of the drive of the main components of the shutter charging device 1 in Embodiment 1.

The operation of the shutter charging device of Embodiment 1 will be described through reference to FIGS. 14A and 14B. FIGS. 14A and 14B show the charge lever 23 of the shutter, the lock lever 31, the charging member 13, and the drive gear 14. SW1, SW2, SW3 indicate the state of the signal generated by the encoder board and the encoder contact 14*b* which rotate integrally with the drive gear 14. A 3-bit signal consisting of SW1, SW2, and SW3 will hereinafter be called an encoder signal. The rotational angle of the drive gear 14 of the shutter charging device 1 can be detected by the controller by monitoring this encoder signal. In Embodiment 1, a 3-bit signal is outputted as the encoder signal, but a signal other than 3 bits may be used according to the control of the camera body 100 by the camera controller 140. The camera controller 140 detects the encoder signal and controls the DC motor 19, etc., according to the encoder signal.

State (1) at the left end in FIG. 14A shows the state at the end of imaging. At this point, the encoder signal is HHH, indicating SW1, SW2, SW3, in that order (hereinafter given in this order). When charging is performed, the state of the shutter charging device 1 transitions to the next state on the right, one after the other. As the charging proceeds, the state goes from state 1 on the left end in FIG. 14A to state 5 on the right end, and then goes from state 6 on the left end in FIG. 14B to state 10 on the right end, in order. The states 1 to 10 shown in FIGS. 14A and 14B correspond to an example of a predetermined sequence.

When charging is commenced (state (1)), the DC motor 19 begins to rotate, and the drive gear 14 begins to rotate clockwise (the direction of arrow R2) in FIG. 14. At this point the protrusion 31*b* of the lock lever 31 is in contact with the final gear tooth 13*e* of the rack gear 13*a* of the charging member 13, and the lock lever 31 is in a state of having rotated counterclockwise in the drawing around the shaft 33 up to the position where the protrusion 31*a* of the lock lever 31 does not enter the rotational path of the skip-tooth part 14*a* of the drive gear 14 (an example of a retracted position).

After the drive gear 14 has idled until the rotation of the DC motor 19 has caused the skip-tooth part 14*a* start meshing with the rack gear 13*a* of the charging member 13, the result is state (2), the start of charging member drive. The encoder signal here is HHL.

State (3) is when a state in which the drive gear 14 is rotating clockwise is in the middle of charging. In the charging operation, downward movement of the charging member 13 is accompanied by the generation of biasing force at the first elastic member and second elastic member for moving the second curtain blade 24 and the first curtain blade 25. Also, downward movement of the charging member 13 is accompanied by clockwise rotation of the lock lever 31, which is in contact with the charging member 13, under the biasing force of the spring 32. The protrusion 31*a* first rides up onto the flat cam portion 14*c*. Since the encoder signal changes from HHH to HHL here, it can be confirmed that the charging operation is in progress by checking the encoder signal.

Then, when the drive gear 14 rotates further and the flat cam portion 14*c* passes under the protrusion 31*a*, the lock lever 31 rotates downward around the shaft 33, and the protrusion 31*a* enters the rotational path of the skip-tooth part 14*a*. The protrusion 31*c* of the lock lever 31 contacts an end 11*e* (see FIG. 11B) of the recess 11*b*, and the lock lever 31 is biased downward by the spring 32, causing the protrusion 31*a* to stop at a position where it has entered the rotational path of the skip-tooth part 14*a* (state (4)). At this point the charging of the first elastic member and the second elastic member is complete, and the encoder signal transitions to HHL. When the camera controller 140 detects that the encoder signal has become HHL, it is detected that the second curtain blade 24 has moved to its retracted position from the opening 21 of the focal plane shutter device 2, and the state of the entire camera changes to a state in which live view (LV) is possible. During this time the drive gear 14 rotates further, resulting in state (5). When the camera controller 140 detects that the encoder signal has become LHH, the camera controller 140 stops driving the DC motor 19. As a result, the drive gear 14 stops in a state in which the final gear tooth 13*e* of the rack gear 13*a* (the uppermost gear tooth in the drawings) is in contact with the flat cam portion 14*c*, and there is a transition to state (6) in which LV is possible (FIG. 14B).

When the user then gives a command to commence imaging, such as by pressing the release button 131 (see FIG. 1), the camera controller 140 re-actuates the DC motor 19 to start rotation of the drive gear 14 in the clockwise direction so that the opening 21 of the focal plane shutter device 2 will be blocked off by the first curtain blade 25 (state (7)).

When the blocking of the first curtain blade 25 begins, the encoder signal transitions to HLH. When the first curtain blade 25 has completely covered the opening 21, the encoder signal transitions from HLH to HHH (state (8)). Upon detecting that the encoder signal is HHH, the camera controller 140 applies short braking to the DC motor 19. However, the drive gear 14 does not stop immediately after short braking, and instead tries to keep rotating by inertia. At this point, the charging member 13 is driven downward by the drive gear 14, so the protrusion 31b of the lock lever 31 rotates clockwise (downward) under the biasing force of the spring 32 in conjunction with the movement of the charging member 13, and the protrusion 31a of the lock lever 31 enters the rotational path of the skip-tooth part 14a of the drive gear 14.

Therefore, inertial rotation of the drive gear 14 is prohibited by contact between the skip-tooth part 14a and the protrusion 31a of the lock lever 31, resulting in state (9) in which the drive gear 14 is stopped at this position. This state (9) corresponds to an example of a predetermined timing at which the drive gear 14 stops.

Meanwhile, when the drive gear 14 rotates from state (8), the flat cam portion 14c passes through the path of the final gear tooth 13e of the rack gear 13a (the uppermost gear tooth in the drawings), and contact between the two is released. Consequently, the charging member 13 is moved upward by the biasing force of the charge lever 23 of the focal plane shutter device 2. The final gear tooth 13e of the rack gear 13a of the charging member 13 contacts the protrusion 31b of the lock lever 31. The final gear tooth 13e causes the lock lever 31 to rotate counterclockwise (upward) against the biasing force of the spring 32, and retracts the protrusion 31a of the lock lever 31 out of the rotational path of the skip-tooth part 14a of the drive gear 14. Therefore, the drive gear 14 is always able to stop stably in state (10) by means of short braking. That is, it is possible to reduce the imaging interval in continuous capture, without the need for the above-mentioned time delay T, and without any variance in the stop position of the drive gear 14 due to individual difference or the environment.

5. Effect, etc.

As described above, in this embodiment, the shutter charging device 1 comprises the charging member 13 (an example of a driver), the gear component 40, and the lock lever 31 (an example of a brake member). The shutter charging device 1 charges the focal plane shutter device 2, which comprises the opening 21 and the second curtain blade 24 and first curtain blade 25 that are able to block off the opening 21. The charging member 13 drives the second curtain blade 24 and the first curtain blade 25 in a predetermined sequence. The gear component 40 includes the drive gear 14 that drives the charging member 13 only one sequence by each rotation, and transmits the rotation of the DC motor 19 (an example of a motor) to the charging member 13. The lock lever 31 stops the drive gear 14. The lock lever 31 also operates so that the drive gear 14 stops at a predetermined timing in one sequence.

Consequently, since the drive gear 14 stops at the same timing in one sequence, variance in the next operation time is reduced, and there is less need to ensure a time delay for absorbing variance.

Also, in this embodiment, when the lock lever 31 has stopped the drive gear 14, the opening 21 is blocked off by the first curtain blade 25.

Consequently, in an imaging standby state, since the drive gear 14 is stopped at the same position, there is less variance between charging times, and there is also less need to ensure a time delay for absorbing variance, so the frame rate can be increased in continuous capture.

Also, in this embodiment, the lock lever 31 configured so that it can move reciprocally between a stop position for stopping the drive gear 14 at a predetermined timing, and a retracted position at which it is retracted from the drive gear 14, the lock lever 31 moves from the retracted position to the stop position upon completion of charging, and the drive gear 14 stops upon contacting the lock lever 31 in the stop position as a result of its rotation.

Consequently, in an imaging standby state, since the drive gear 14 is stopped at the same position, there is less variance between charging times, and there is also less need to ensure a time delay for absorbing variance, so the frame rate can be increased in continuous capture.

Also, in this embodiment, the charging member 13 charges a spring member for driving the second curtain blade 24 and the first curtain blade 25. This charging is performed by the transmission of the drive force of the drive gear 14 to the charging member 13. After the charging is complete and the opening 21 has been blocked off by the first curtain blade 25, the charging member 13 is disconnected from the transmission from the drive gear 14 and returns to its initial position, which is the position prior to charging.

Consequently, since the return of the charging member 13 to its initial position also entails the release of the braking operation of the drive gear 14 by means of the lock lever 31, there is no need to provide any extra components for releasing the lock lever 31, which means that fewer parts will be necessary.

Also, in this embodiment, the braking operation of the lock lever 31 on the drive gear 14 is performed in a state in which the supply of power to the DC motor 19 is stopped and the motor is rotating only by inertia.

Also, the inertial force is exerted when the DC motor 19 is in a short braking state or an open state.

Consequently, after the motor stops, the drive gear 14 stops at the same position in the imaging standby state, so variance between charging times is reduced and there is less need to ensure a time delay for absorbing variance, making it possible to increase the frame rate during continuous capture.

Also, in this embodiment, the digital camera 300 (an example of an imaging device) comprises the focal plane shutter device 2, the shutter charging device 1, and the camera controller 140 (an example of a controller). The focal plane shutter device 2 has the opening 21 and the second curtain blade 24 (an example of a second curtain) and the first curtain blade 25 (an example of a first curtain) that can block off the opening. The shutter charging device 1 charges the focal plane shutter device 2. The camera controller 140 controls the shutter charging device 1 and the focal plane shutter device 2 so that the stop position of the drive gear 14 in an imaging standby state in which the opening 21 is blocked off by the first curtain blade 25 will be the same position.

Consequently, in an imaging standby state, since the drive gear 14 stops at the same position, variance between charging times is reduced and there is less need to ensure a time delay for absorbing variance, making it possible to increase the frame rate during continuous capture.

Other Embodiments

Embodiment 1 was given above as an example of the technology disclosed herein. However, the technology of this disclosure is not limited to this embodiment, and is also applicable to embodiments in which changes, substitutions, additions, omissions, and so forth are made as needed. Also, the various constituent elements described in Embodiment 1 may be combined to create new embodiments.

In view of this, the following are examples of other embodiments.

Figure 15:
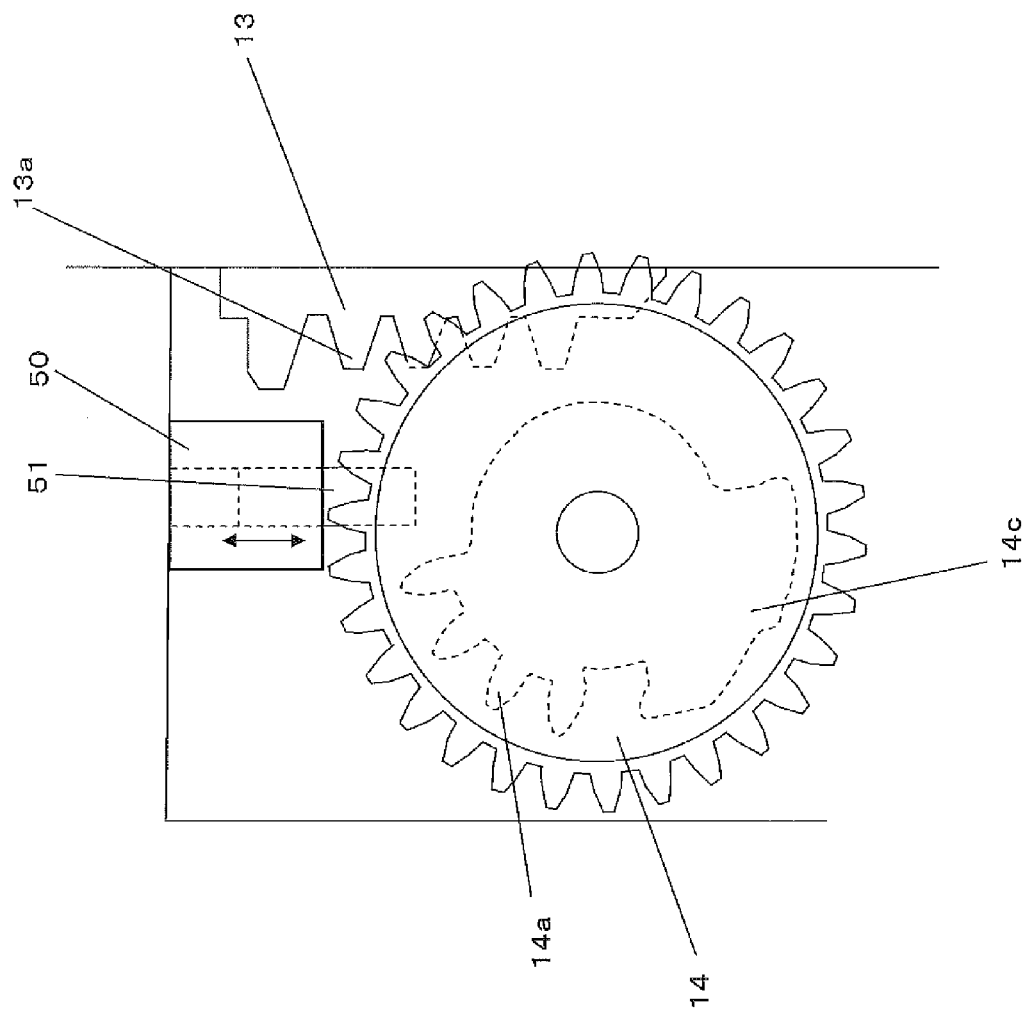
FIG. 15 is a side view of the main components of the shutter charging device in a modification example of Embodiment 1.

In Embodiment 1, the lock lever 31 was given as an example of a brake member, but the brake member may be any one that operates such that the drive gear 14 stops at a predetermined timing in one sequence. Therefore, the brake member is not limited to the lock lever 31. For example, as shown in FIG. 15, the constitution may be such that a solenoid 50 and a movable iron core 51 (an example of a brake member) are provided, and the movable iron core 51 can move back and forth between a state in which the distal end portion of the movable iron core 51 has entered the rotational path of the skip-tooth part 14*a* of the drive gear 14, and a state in which it has retracted outside of the rotational path. However, using the lock lever 31 as the brake member allows the stopping of the drive gear 14 to be realized by a simpler configuration, and takes up less space, than using the movable iron core 51, the solenoid 50, and so forth.

Also, in Embodiment 1, a digital camera with an interchangeable lens mount was described as an example of an imaging device, but this is not the only option, and a compact digital camera whose lens mount is not interchangeable, or the like may be used instead.

Also, in Embodiment 1, short braking was applied to the DC motor 19 when the drive gear 14 was stopped with the lock lever 31, but this may be an open state instead.

Embodiments were given above as examples of the technology in the present disclosure, and a detailed description and the appended drawings were provided to this end.

Therefore, the constituent elements discussed in the detailed description and shown in the appended drawings can encompass not just those constituent elements that are essential to solving the problem, but also any constituent elements that are not essential to solving the problem. Accordingly, just because these non-essential constituent elements are discussed in the detailed description and shown in the appended drawings, it should not be concluded right away that these non-essential constituent elements are actually essential.

Also, since the above embodiments are merely illustrative of the technology in this disclosure, various changes, substitutions, additions, omissions, and so forth can be made within the scope of the patent claims or equivalents thereof.

INDUSTRIAL APPLICABILITY

The shutter charging device disclosed herein has the effect of allowing a stable charging time to be obtained, and allowing an increase in the frame rate during continuous capture, and can be applied to camera systems and the like. More specifically, it can be applied to digital still cameras, video cameras, and the like.

REFERENCE SIGNS LIST

1 shutter charging device
2 shutter device
11 charging base plate
12 retainer plate
13 charging member (an example of a driver)
14 drive gear
15 idle gear
16 step gear
17 step gear
18 pinion gear
19 motor
20 shutter base plate
21 opening
22 shutter driving mechanism
23 charge lever
24 second curtain blade
25 first curtain blade
31 lock lever (an example of a brake member)
32 spring
33 shaft
40 gear component
100 camera body
110 CMOS image sensor
111 A/D converter
112 timing generator
113 CMOS circuit board
120 camera monitor
130 interface unit
131 release button
132 power switch
140 camera controller
142 main circuit board
150 body mount
160 power supply
170 card slot
171 memory card
200 lens unit
215 driver
240 lens controller
250 lens mount
260 lens barrel
300 digital camera
410 second curtain drive pin
420 first curtain drive pin
430 first cam
431 first protrusion
432 second protrusion
433 third protrusion
440 second cam
441 protrusion
450 solenoid
460 second curtain auxiliary drive pin
461 contact part
462 protrusion
470 second curtain movement spring member (an example of a spring member)
480 spring member
490 solenoid
500 first curtain auxiliary drive pin
501 contact part
502 protrusion
510 first curtain movement spring member (an example of a spring member)
520 spring member
530 solenoid
541 first connecting arm
542 second connecting arm

The invention claimed is:

1. A shutter charging device for charging a shutter device, the shutter device equipped with an opening and first and second curtains capable of blocking off the opening, said shutter charging device comprising:
 a driver configured to drive the first and second curtains in a predetermined sequence;
 a gear component configured to include a drive gear that drive the driver just one sequence by each rotation, and transmit a rotation of a motor to the driver; and
 a brake member configured to stop the drive gear,
 wherein the brake member operates so that the drive gear stops at a predetermined timing in said one sequence.

2. The shutter charging device according to claim 1, wherein the opening is blocked off by the first curtain when the brake member has stopped the drive gear.

3. The shutter charging device according to claim 2,
wherein the brake member is configured to be capable of providing a reciprocal motion between a stop position for stopping the drive gear at the predetermined timing, and a retracted position at which the brake member is retracted from the drive gear,
the brake member moves from the retracted position to the stop position when charging is complete, and
the rotation of the drive gear causes it to contact the brake member in the stop position and come to a stop.

4. The shutter charging device according to claim 3,
wherein the driver is a charging member for charging a spring member that drives the first and second curtains,
the charging is performed by the transmission of the drive force of the drive gear to the charging member, and
after charging is complete and the opening has been blocked off by the first curtain, the transmission from the drive gear is released and the charging member returns to its initial position, which is its position prior to charging.

5. The shutter charging device according to claim 4,
wherein the braking operation of the drive gear by the brake member is released when the charging member returns to its initial position.

6. The shutter charging device according to claim 1,
wherein the braking operation of the drive gear by the brake member is performed in a state in which a supply of power to the motor has been stopped and the drive gear is rotated by inertia.

7. The shutter charging device according to claim 6,
wherein the motor is a DC motor, and
the inertia is when the motor is in a short braking state or an open state.

8. An imaging device including the shutter charging device according to claim 1, said imaging device comprising:
a shutter device configured to be charged by the shutter charging device and having an opening and first and second curtains capable of blocking off the opening; and
a controller configured to control the shutter charging device and the shutter device so that a stop position of the drive gear at the predetermined timing is a same position in an imaging standby state in which the opening is blocked off by the first curtain.

9. A shutter device comprising:
first and second curtains capable of blocking off an opening;
a driver configured to drive the first and second curtains in a predetermined sequence;
a gear component including a drive gear configured to drive the driver only one sequence by each rotation, and to convey a rotational force to the driver; and
a brake member configured to stop the drive gear;
wherein the brake member operates so that the drive gear stops at a predetermined timing in one sequence.

* * * * *